(12) United States Patent
Patmore et al.

(10) Patent No.: US 12,062,927 B2
(45) Date of Patent: *Aug. 13, 2024

(54) POWER TRANSFER SYSTEM WITH PATIENT SUPPORT APPARATUS AND POWER TRANSFER DEVICE TO TRANSFER POWER TO THE PATIENT SUPPORT APPARATUS

(71) Applicant: Stryker Corporation, Kalamazoo, MI (US)

(72) Inventors: Kevin M. Patmore, Plainwell, MI (US); Daniel V. Brosnan, Kalamazoo, MI (US); Kurosh Nahavandi, Portage, MI (US); Annie Desaulniers, Bothell, WA (US); Aaron D. Furman, Kalamazoo, MI (US); Krishna S. Bhimavarapu, Kalamazoo, MI (US); Jeffrey S. Dunfee, II, Kalamazoo, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/844,345

(22) Filed: Jun. 20, 2022

(65) Prior Publication Data
US 2022/0320916 A1 Oct. 6, 2022

Related U.S. Application Data

(63) Continuation of application No. 16/168,170, filed on Oct. 23, 2018, now Pat. No. 11,394,252.
(Continued)

(51) Int. Cl.
*H02J 50/90* (2016.01)
*A61G 3/02* (2006.01)
(Continued)

(52) U.S. Cl.
CPC ............ *H02J 50/90* (2016.02); *A61G 3/0218* (2013.01); *A61G 12/004* (2013.01);
(Continued)

(58) Field of Classification Search
CPC ........ H02J 50/90; H02J 50/10; A61G 3/0218; A61G 12/004; A61G 12/005; A61G 12/007; A61G 12/008
See application file for complete search history.

(56) References Cited

U.S. PATENT DOCUMENTS 3,644,945 A  2/1972  Goodman et al.
3,743,905 A  7/1973  Goodman et al.
(Continued)

FOREIGN PATENT DOCUMENTS

AU  2008316723     4/2009
AU  2008316723 A1  4/2009
(Continued)

OTHER PUBLICATIONS

Colson Group USA, "EZ Wheel Brochure", 2017, 4 pages.
(Continued)

*Primary Examiner* — Nghia M Doan
(74) *Attorney, Agent, or Firm* — Howard & Howard Attorneys PLLC

(57) ABSTRACT

A power transfer system comprises a patient support apparatus and a power transfer device. The power transfer system provides convenience and ease of connection between a power source and the patient support apparatus to provide power to one or more electrically powered devices on the patient support apparatus or to provide energy for an energy storage device on the patient support apparatus.

21 Claims, 19 Drawing Sheets

Related U.S. Application Data

(60) Provisional application No. 62/576,309, filed on Oct. 24, 2017.

(51) Int. Cl.
*A61G 12/00* (2006.01)
*H02J 50/10* (2016.01)

(52) U.S. Cl.
CPC ......... *A61G 12/005* (2013.01); *A61G 12/007* (2013.01); *A61G 12/008* (2013.01); *H02J 50/10* (2016.02)

(56) References Cited

U.S. PATENT DOCUMENTS

| | | | |
|---|---|---|---|
| 3,763,979 A | 10/1973 | Goodman et al. |
| 4,095,822 A | 6/1978 | Thornhill |
| 4,944,056 A | 7/1990 | Schroeder et al. |
| 4,961,422 A | 10/1990 | Marchosky et al. |
| 5,164,623 A | 11/1992 | Shkondin |
| 5,197,466 A | 3/1993 | Marchosky et al. |
| 5,591,217 A | 1/1997 | Barreras |
| 5,697,110 A | 12/1997 | Campbell |
| 5,708,993 A | 1/1998 | Campbell et al. |
| 5,769,877 A | 6/1998 | Barreras, Sr. |
| 5,806,110 A | 9/1998 | Kunz et al. |
| 5,806,111 A | 9/1998 | Heimbrock et al. |
| 5,807,397 A | 9/1998 | Barreras |
| 5,821,728 A | 10/1998 | Schwind |
| 5,821,731 A * | 10/1998 | Kuki ............... H02J 7/0045 320/108 |
| 5,991,665 A | 11/1999 | Wang et al. |
| 6,460,828 B1 | 10/2002 | Gersemsky et al. |
| 6,532,607 B1 | 3/2003 | Heil |
| 6,802,385 B2 | 10/2004 | Pyntikov et al. |
| 6,838,174 B2 | 1/2005 | Nakahigashi |
| 6,870,475 B2 | 3/2005 | Fitch et al. |
| 6,871,714 B2 | 3/2005 | Johnson |
| 6,966,083 B1 | 11/2005 | Cheng |
| 7,010,369 B2 | 3/2006 | Borders et al. |
| 7,154,397 B2 | 12/2006 | Zerhusen et al. |
| 7,256,705 B2 | 8/2007 | Kagermeier et al. |
| 7,321,811 B1 | 1/2008 | Rawls-Meehan |
| 7,398,571 B2 | 7/2008 | Souke et al. |
| 7,404,221 B2 | 7/2008 | Sackner |
| 7,465,280 B2 | 12/2008 | Rawls-Meehan |
| 7,528,521 B2 | 5/2009 | Naitou et al. |
| 7,530,616 B2 | 5/2009 | Pomper |
| 7,650,192 B2 | 1/2010 | Wahlstrand |
| 7,679,520 B2 | 3/2010 | Zerhusen et al. |
| 7,725,968 B2 | 6/2010 | Lambarth |
| 7,825,544 B2 | 11/2010 | Jansen et al. |
| 7,868,740 B2 | 1/2011 | McNeely et al. |
| 7,887,113 B2 | 2/2011 | Lambarth et al. |
| 7,911,349 B2 | 3/2011 | Zerhusen et al. |
| 8,000,800 B2 | 8/2011 | Takeda et al. |
| 8,006,332 B2 | 8/2011 | Lemire et al. |
| 8,019,486 B2 | 9/2011 | Rawls-Meehan |
| 8,031,057 B2 | 10/2011 | McNeely et al. |
| 8,032,263 B2 | 10/2011 | Rawls-Meehan |
| 8,035,255 B2 | 10/2011 | Kurs et al. |
| 8,046,115 B2 | 10/2011 | Rawls-Meehan |
| 8,046,116 B2 | 10/2011 | Rawls-Meehan |
| 8,046,117 B2 | 10/2011 | Rawls-Meehan |
| 8,056,163 B2 | 11/2011 | Lemire et al. |
| 8,056,950 B2 | 11/2011 | Souke et al. |
| 8,063,785 B2 | 11/2011 | Sacchetti |
| 8,069,512 B2 | 12/2011 | Rawls-Meehan |
| 8,078,336 B2 | 12/2011 | Rawls-Meehan |
| 8,078,337 B2 | 12/2011 | Rawls-Meehan |
| 8,106,539 B2 | 1/2012 | Schatz et al. |
| 8,121,856 B2 | 2/2012 | Huster et al. |
| 8,125,318 B2 | 2/2012 | Heimbrock et al. |
| 8,129,865 B2 | 3/2012 | Krumme et al. |
| 8,143,846 B2 | 3/2012 | Herman et al. |
| 8,177,274 B2 | 5/2012 | Pomper |
| 8,285,388 B2 | 10/2012 | Wahlstrand |
| 8,295,940 B2 | 10/2012 | Sherman |
| 8,304,935 B2 | 11/2012 | Karalis et al. |
| 8,324,759 B2 | 12/2012 | Karalis et al. |
| 8,334,779 B2 | 12/2012 | Zerhusen et al. |
| 8,344,860 B2 | 1/2013 | Collins, Jr. et al. |
| 8,362,742 B2 | 1/2013 | Kallmyer |
| 8,368,545 B2 | 2/2013 | Zerhusen et al. |
| 8,375,488 B2 | 2/2013 | Rawls-Meehan |
| 8,400,017 B2 | 3/2013 | Kurs et al. |
| 8,400,104 B2 | 3/2013 | Adamczyk et al. |
| 8,410,636 B2 | 4/2013 | Kurs et al. |
| 8,439,416 B2 | 5/2013 | Lambarth et al. |
| 8,441,154 B2 | 5/2013 | Karalis et al. |
| 8,447,366 B2 | 5/2013 | Ungari et al. |
| 8,461,719 B2 | 6/2013 | Kesler et al. |
| 8,461,720 B2 | 6/2013 | Kurs et al. |
| 8,461,721 B2 | 6/2013 | Karalis et al. |
| 8,461,722 B2 | 6/2013 | Kurs et al. |
| 8,466,583 B2 | 6/2013 | Karalis et al. |
| 8,471,410 B2 | 6/2013 | Karalis et al. |
| 8,476,788 B2 | 7/2013 | Karalis et al. |
| 8,482,158 B2 | 7/2013 | Kurs et al. |
| 8,487,480 B1 | 7/2013 | Kesler et al. |
| 8,497,601 B2 | 7/2013 | Hall et al. |
| 8,499,384 B2 | 8/2013 | Zerhusen |
| 8,536,990 B2 | 9/2013 | Collins, Jr. et al. |
| 8,551,163 B2 | 10/2013 | Aber et al. |
| 8,554,322 B2 | 10/2013 | Olson et al. |
| 8,565,934 B2 | 10/2013 | Rawls-Meehan |
| 8,569,914 B2 | 10/2013 | Karalis et al. |
| 8,587,153 B2 | 11/2013 | Schatz et al. |
| 8,587,155 B2 | 11/2013 | Giler et al. |
| 8,604,916 B2 | 12/2013 | McNeely et al. |
| 8,604,917 B2 | 12/2013 | Collins et al. |
| 8,606,344 B2 | 12/2013 | DiMaio et al. |
| 8,618,696 B2 | 12/2013 | Kurs et al. |
| 8,626,249 B2 | 1/2014 | Ungari et al. |
| 8,629,578 B2 | 1/2014 | Kurs et al. |
| 8,634,981 B1 | 1/2014 | Hyde et al. |
| 8,641,629 B2 | 2/2014 | Kurokawa |
| 8,669,676 B2 | 3/2014 | Karalis et al. |
| 8,674,839 B2 | 3/2014 | Zerhusen et al. |
| 8,686,598 B2 | 4/2014 | Schatz et al. |
| 8,692,410 B2 | 4/2014 | Schatz et al. |
| 8,716,903 B2 | 5/2014 | Kurs et al. |
| 8,723,366 B2 | 5/2014 | Fiorello et al. |
| 8,725,262 B2 | 5/2014 | Olson et al. |
| 8,729,737 B2 | 5/2014 | Schatz et al. |
| 8,764,621 B2 | 7/2014 | Badstibner et al. |
| 8,772,973 B2 | 7/2014 | Kurs |
| 8,782,826 B2 | 7/2014 | White et al. |
| 8,799,011 B2 | 8/2014 | Wilson et al. |
| 8,847,548 B2 | 9/2014 | Kesler et al. |
| 8,862,241 B2 | 10/2014 | Forsell |
| 8,864,205 B2 | 10/2014 | Lemire et al. |
| 8,866,598 B2 | 10/2014 | Collins, Jr. et al. |
| 8,869,328 B2 | 10/2014 | Rawls-Meehan |
| 8,886,333 B2 | 11/2014 | Lui et al. |
| 8,886,383 B2 | 11/2014 | Hyde et al. |
| 8,887,619 B2 | 11/2014 | Kallmyer et al. |
| 8,890,470 B2 | 11/2014 | Partovi |
| 8,896,264 B2 | 11/2014 | Partovi |
| 8,901,778 B2 | 12/2014 | Kesler et al. |
| 8,901,779 B2 | 12/2014 | Kesler et al. |
| 8,901,881 B2 | 12/2014 | Partovi |
| 8,907,531 B2 | 12/2014 | Hall et al. |
| 8,909,378 B2 | 12/2014 | Rawls-Meehan |
| 8,912,687 B2 | 12/2014 | Kesler et al. |
| 8,917,166 B2 | 12/2014 | Collins, Jr. et al. |
| 8,928,276 B2 | 1/2015 | Kesler et al. |
| 8,933,594 B2 | 1/2015 | Kurs et al. |
| 8,937,408 B2 | 1/2015 | Ganem et al. |
| 8,946,938 B2 | 2/2015 | Kesler et al. |
| 8,963,488 B2 | 2/2015 | Campanella et al. |
| 8,973,963 B2 | 3/2015 | Lambarth et al. |
| 8,984,685 B2 | 3/2015 | Robertson et al. |
| 9,002,469 B2 | 4/2015 | D'Ambrosio |

(56) References Cited

U.S. PATENT DOCUMENTS

| | | |
|---|---|---|
| 9,038,218 B1 | 5/2015 | Heil et al. |
| 9,044,365 B2 | 6/2015 | Rawls-Meehan |
| 9,044,366 B2 | 6/2015 | Rawls-Meehan |
| 9,050,031 B2 | 6/2015 | Collins, Jr. et al. |
| 9,052,718 B2 | 6/2015 | Hyde et al. |
| 9,059,599 B2 | 6/2015 | Won et al. |
| 9,079,043 B2 | 7/2015 | Stark et al. |
| 9,089,462 B1 | 7/2015 | Lafleche |
| 9,093,853 B2 | 7/2015 | Schatz et al. |
| 9,101,521 B2 | 8/2015 | White et al. |
| 9,105,959 B2 | 8/2015 | Kesler et al. |
| 9,106,203 B2 | 8/2015 | Kesler et al. |
| 9,107,783 B2 | 8/2015 | Childs et al. |
| 9,108,063 B2 | 8/2015 | Olson et al. |
| 9,114,050 B2 | 8/2015 | White et al. |
| 9,125,779 B2 | 9/2015 | Hyde et al. |
| 9,132,051 B2 | 9/2015 | Heil |
| 9,149,126 B2 | 10/2015 | Rawls-Meehan |
| 9,160,203 B2 | 10/2015 | Fiorello et al. |
| 9,161,633 B2 | 10/2015 | Rawls-Meehan |
| 9,173,793 B2 | 11/2015 | Rawls-Meehan |
| 9,173,794 B2 | 11/2015 | Rawls-Meehan |
| 9,182,750 B2 | 11/2015 | Rawls-Meehan |
| 9,184,595 B2 | 11/2015 | Kurs et al. |
| 9,218,454 B2 | 12/2015 | Kiani et al. |
| 9,220,651 B2 | 12/2015 | Hyde et al. |
| 9,233,039 B2 | 1/2016 | Hyde et al. |
| 9,237,814 B2 | 1/2016 | Rawls-Meehan |
| 9,241,858 B2 | 1/2016 | Hyde et al. |
| 9,246,336 B2 | 1/2016 | Kurs et al. |
| 9,259,369 B2 | 2/2016 | Derenne et al. |
| 9,270,134 B2 | 2/2016 | Gaddam et al. |
| 9,278,036 B2 | 3/2016 | Lee |
| 9,281,701 B2 | 3/2016 | Large et al. |
| 9,286,441 B2 | 3/2016 | Zerhusen et al. |
| 9,289,336 B2 | 3/2016 | Lambarth et al. |
| 9,295,849 B2 | 3/2016 | Elghazzawi et al. |
| 9,306,322 B2 | 4/2016 | Bhimavarapu et al. |
| 9,308,303 B2 | 4/2016 | Badstibner et al. |
| 9,314,105 B2 | 4/2016 | Ralws-Meehan |
| 9,314,928 B2 | 4/2016 | Hyde et al. |
| 9,314,929 B2 | 4/2016 | Hyde et al. |
| 9,333,136 B2 | 5/2016 | Gibson et al. |
| 9,336,672 B2 | 5/2016 | Collins, Jr. et al. |
| 9,364,625 B2 | 6/2016 | Silver et al. |
| 9,369,182 B2 | 6/2016 | Kurs et al. |
| 9,375,374 B2 | 6/2016 | Herman et al. |
| 9,381,125 B2 | 7/2016 | Herbst et al. |
| 9,392,875 B2 | 7/2016 | Weyl |
| 9,397,518 B1 | 7/2016 | Theobald |
| 9,407,110 B2 | 8/2016 | Lui et al. |
| 9,425,640 B2 | 8/2016 | Moran |
| 9,427,367 B2 | 8/2016 | White et al. |
| 9,433,546 B2 | 9/2016 | Rawls-Meehan et al. |
| 9,444,520 B2 | 9/2016 | Hall et al. |
| 9,451,833 B2 | 9/2016 | Rawls-Meehan |
| 9,456,939 B2 | 10/2016 | Lambarth et al. |
| 9,463,126 B2 | 10/2016 | Zerhusen et al. |
| 9,463,324 B2 | 10/2016 | Olson et al. |
| 9,465,915 B2 | 10/2016 | McNeely et al. |
| 9,492,339 B2 | 11/2016 | Leib |
| 9,496,719 B2 | 11/2016 | Kesler et al. |
| 9,513,899 B2 | 12/2016 | Collins, Jr. et al. |
| 9,515,494 B2 | 12/2016 | Kurs et al. |
| 9,515,495 B2 | 12/2016 | Kurs et al. |
| 9,517,034 B2 | 12/2016 | Collins, Jr. et al. |
| 9,526,346 B2 | 12/2016 | Rawls-Meehan |
| 9,526,665 B2 | 12/2016 | Rawls-Meehan et al. |
| 9,527,699 B2 | 12/2016 | Liljedahl |
| 9,537,344 B2 | 1/2017 | Thompson et al. |
| 9,560,787 B2 | 1/2017 | Kallmyer et al. |
| 9,577,436 B2 | 2/2017 | Kesler et al. |
| 9,584,189 B2 | 2/2017 | Kurs et al. |
| 9,596,005 B2 | 3/2017 | Kurs et al. |
| 9,601,261 B2 | 3/2017 | Schatz et al. |
| 9,601,270 B2 | 3/2017 | Kurs et al. |
| 9,615,983 B2 | 4/2017 | Stryker et al. |
| 9,734,293 B2 | 8/2017 | Collins, Jr. et al. |
| 9,768,645 B2 | 9/2017 | Tetu et al. |
| 10,004,651 B2 | 6/2018 | DeLuca et al. |
| 10,910,888 B2 | 2/2021 | Patmore et al. |
| 11,251,663 B2 | 2/2022 | Patmore et al. |
| 2003/0079923 A1 | 5/2003 | Johnson |
| 2004/0083394 A1 | 4/2004 | Brebner et al. |
| 2005/0155149 A1 | 7/2005 | Pedersen |
| 2006/0059623 A1 | 3/2006 | Karmer et al. |
| 2006/0108977 A1 | 5/2006 | Kagermeier et al. |
| 2006/0249320 A1 | 11/2006 | Carter et al. |
| 2007/0211866 A1 | 9/2007 | Sink |
| 2007/0219950 A1 | 9/2007 | Crawford |
| 2007/0299473 A1 | 12/2007 | Matos |
| 2008/0041282 A1 | 2/2008 | Goschy et al. |
| 2008/0086817 A1 | 4/2008 | Zucker et al. |
| 2008/0295595 A1 | 12/2008 | Tacklind et al. |
| 2009/0121660 A1 | 5/2009 | Rawls-Meehan |
| 2010/0045146 A1 | 2/2010 | Thorne |
| 2010/0277121 A1 | 11/2010 | Hall et al. |
| 2010/0314946 A1 | 12/2010 | Budde et al. |
| 2010/0328044 A1 | 12/2010 | Waffenschmidt et al. |
| 2011/0011878 A1 | 1/2011 | Baer et al. |
| 2011/0043049 A1 | 2/2011 | Karalis et al. |
| 2011/0117529 A1 | 5/2011 | Barash et al. |
| 2011/0162067 A1 | 6/2011 | Shuart et al. |
| 2011/0208074 A1 | 8/2011 | Anderson |
| 2011/0247134 A1 | 10/2011 | Howell et al. |
| 2011/0247137 A1 | 10/2011 | Herman et al. |
| 2011/0278948 A1 | 11/2011 | Forsell |
| 2011/0298420 A1 | 12/2011 | Forsberg et al. |
| 2012/0056729 A1 | 3/2012 | Rawls-Meehan |
| 2012/0057685 A1 | 3/2012 | Rawls-Meehan |
| 2012/0069961 A1 | 3/2012 | Pomper et al. |
| 2012/0084920 A1 | 4/2012 | Zucker et al. |
| 2012/0086284 A1 | 4/2012 | Capanella et al. |
| 2012/0091794 A1 | 4/2012 | Campanella et al. |
| 2012/0091796 A1 | 4/2012 | Kesler et al. |
| 2012/0091797 A1 | 4/2012 | Kesler et al. |
| 2012/0091819 A1 | 4/2012 | Kulikowski et al. |
| 2012/0091820 A1 | 4/2012 | Campanella et al. |
| 2012/0091949 A1 | 4/2012 | Campanella et al. |
| 2012/0110738 A1 | 5/2012 | Rawls-Meehan |
| 2012/0110824 A1 | 5/2012 | Smith et al. |
| 2012/0112536 A1 | 5/2012 | Karalis et al. |
| 2012/0112538 A1 | 5/2012 | Kesler et al. |
| 2012/0112691 A1 | 5/2012 | Kurs et al. |
| 2012/0117730 A1* | 5/2012 | Lemire .................. A61G 1/04 5/611 |
| 2012/0119569 A1 | 5/2012 | Karalis et al. |
| 2012/0119698 A1 | 5/2012 | Karalis et al. |
| 2012/0123242 A1 | 5/2012 | Stilley et al. |
| 2012/0139355 A1 | 6/2012 | Ganem et al. |
| 2012/0228952 A1 | 9/2012 | Hall et al. |
| 2012/0235501 A1 | 9/2012 | Kesler et al. |
| 2012/0235502 A1 | 9/2012 | Kesler et al. |
| 2012/0235504 A1 | 9/2012 | Kesler et al. |
| 2012/0235566 A1 | 9/2012 | Karalis et al. |
| 2012/0242159 A1 | 9/2012 | Lou et al. |
| 2012/0248886 A1 | 10/2012 | Kesler et al. |
| 2012/0248887 A1 | 10/2012 | Kesler et al. |
| 2012/0248888 A1 | 10/2012 | Kesler et al. |
| 2012/0248981 A1 | 10/2012 | Karalis et al. |
| 2012/0312196 A1 | 12/2012 | Newkirk |
| 2012/0326660 A1 | 12/2012 | Lu et al. |
| 2013/0088194 A1* | 4/2013 | Hunter .................. B60L 53/30 320/108 |
| 2013/0106347 A1 | 5/2013 | Kallmyer et al. |
| 2013/0109973 A1 | 5/2013 | Kurokawa |
| 2013/0191992 A1 | 8/2013 | Rawls-Meehan |
| 2014/0004814 A1 | 1/2014 | Elghazzawi |
| 2014/0031883 A1 | 1/2014 | Elghazzawi |
| 2014/0039351 A1 | 2/2014 | Mix et al. |
| 2014/0045367 A1 | 2/2014 | Christie et al. |
| 2014/0057235 A1 | 2/2014 | Kellum et al. |
| 2014/0090173 A1 | 4/2014 | DiMaio et al. |
| 2014/0139405 A1 | 5/2014 | Ribble et al. |

(56) References Cited

U.S. PATENT DOCUMENTS

| | | |
|---|---|---|
| 2014/0145915 A1 | 5/2014 | Ribble et al. |
| 2014/0195057 A1 | 7/2014 | Zerhusen et al. |
| 2014/0259414 A1 | 9/2014 | Hayes et al. |
| 2014/0285016 A1 | 9/2014 | Tetu et al. |
| 2014/0312706 A1 | 10/2014 | Fiorello et al. |
| 2014/0312707 A1 | 10/2014 | Fiorello et al. |
| 2014/0327320 A1 | 11/2014 | Muhs et al. |
| 2014/0343968 A1 | 11/2014 | Wilson et al. |
| 2015/0069831 A1 | 3/2015 | Kesler et al. |
| 2015/0075575 A1 | 3/2015 | Karlovich |
| 2015/0088129 A1 | 3/2015 | Ganem et al. |
| 2015/0107020 A1 | 4/2015 | Andersson et al. |
| 2015/0115638 A1 | 4/2015 | Lambarth et al. |
| 2015/0123484 A1 | 5/2015 | Kurs et al. |
| 2015/0128353 A1 | 5/2015 | Kildey |
| 2015/0128354 A1 | 5/2015 | Greenstein et al. |
| 2015/0130412 A1 | 5/2015 | Partovi |
| 2015/0130586 A1 | 5/2015 | Rawls-Meehan |
| 2015/0135436 A1 | 5/2015 | Stryker et al. |
| 2015/0207351 A1 | 7/2015 | Hamburgen et al. |
| 2015/0216749 A1 | 8/2015 | Heil et al. |
| 2015/0251322 A1 | 9/2015 | Goodwin et al. |
| 2015/0252940 A1 | 9/2015 | Goodwin et al. |
| 2015/0255994 A1 | 9/2015 | Kesler et al. |
| 2015/0290061 A1 | 10/2015 | Stafford et al. |
| 2015/0296550 A1 | 10/2015 | Shelly et al. |
| 2015/0297427 A1 | 10/2015 | Lambarth et al. |
| 2015/0297439 A1 | 10/2015 | Karlovich |
| 2015/0335506 A9 | 11/2015 | Kildey |
| 2015/0342806 A1 | 12/2015 | Hyde et al. |
| 2015/0351981 A1 | 12/2015 | Sazonov |
| 2015/0351982 A1 | 12/2015 | Krenik |
| 2015/0357831 A1 | 12/2015 | Fiorello et al. |
| 2015/0362333 A1 | 12/2015 | Miller et al. |
| 2015/0365138 A1 | 12/2015 | Miller et al. |
| 2016/0000622 A1 | 1/2016 | Rawls-Meehan |
| 2016/0013837 A1* | 1/2016 | Howell ............... H04B 5/0037 307/104 |
| 2016/0022218 A1 | 1/2016 | Hayes et al. |
| 2016/0028243 A1 | 1/2016 | Schatz et al. |
| 2016/0043571 A1 | 2/2016 | Kesler et al. |
| 2016/0052129 A1 | 2/2016 | Ekas |
| 2016/0052137 A1 | 2/2016 | Hyde et al. |
| 2016/0052138 A1 | 2/2016 | Hyde et al. |
| 2016/0052139 A1 | 2/2016 | Hyde et al. |
| 2016/0067396 A1 | 3/2016 | Stark et al. |
| 2016/0070267 A1 | 3/2016 | Hyde et al. |
| 2016/0075177 A1 | 3/2016 | Biderman et al. |
| 2016/0089283 A1 | 3/2016 | DeLuca et al. |
| 2016/0117450 A1 | 4/2016 | Zerhusen et al. |
| 2016/0120722 A1 | 5/2016 | Mueller |
| 2016/0120740 A1 | 5/2016 | Rawls-Meehan |
| 2016/0128468 A1 | 5/2016 | Lafleche et al. |
| 2016/0136018 A1 | 5/2016 | DeLuca et al. |
| 2016/0149425 A1 | 5/2016 | Hsu |
| 2016/0158082 A1 | 6/2016 | Gainor et al. |
| 2016/0158083 A1 | 6/2016 | Lambarth et al. |
| 2016/0175602 A1 | 6/2016 | Aoyama et al. |
| 2016/0193397 A9 | 7/2016 | Aber et al. |
| 2016/0199983 A1 | 7/2016 | Hyde et al. |
| 2016/0211695 A1 | 7/2016 | Singer |
| 2016/0213537 A1 | 7/2016 | Hayes et al. |
| 2016/0242558 A1 | 8/2016 | Rawls-Meehan et al. |
| 2016/0242681 A1 | 8/2016 | Shen et al. |
| 2016/0256080 A1 | 9/2016 | Shen et al. |
| 2016/0275776 A1 | 9/2016 | Shen et al. |
| 2016/0301253 A1 | 10/2016 | Kurs et al. |
| 2016/0306762 A1 | 10/2016 | Lee et al. |
| 2016/0330402 A1 | 11/2016 | Benetti et al. |
| 2016/0336812 A1 | 11/2016 | Fiorello et al. |
| 2016/0338891 A1 | 11/2016 | Agdeppa et al. |
| 2016/0362015 A1 | 12/2016 | Fiorello et al. |
| 2016/0367415 A1 | 12/2016 | Hayes et al. |
| 2016/0367420 A1 | 12/2016 | Zerhusen et al. |
| 2016/0374884 A1 | 12/2016 | Blickensderfer et al. |
| 2016/0380488 A1 | 12/2016 | Widmer et al. |
| 2017/0011181 A1 | 1/2017 | McNeely et al. |
| 2017/0020440 A1 | 1/2017 | Flitsch et al. |
| 2017/0027789 A1 | 2/2017 | St.John et al. |
| 2017/0035295 A1 | 2/2017 | Collins, Jr. et al. |
| 2017/0035370 A1 | 2/2017 | Collins, Jr. et al. |
| 2017/0047762 A1 | 2/2017 | Tuseth et al. |
| 2017/0053736 A9 | 2/2017 | Hall et al. |
| 2017/0053737 A1 | 2/2017 | Kurs |
| 2017/0054319 A1 | 2/2017 | Kesler et al. |
| 2017/0055882 A1 | 3/2017 | Al-Ali et al. |
| 2017/0055887 A1 | 3/2017 | Al-Ali |
| 2017/0062124 A9 | 3/2017 | Hall et al. |
| 2017/0063143 A1 | 3/2017 | Hoarau et al. |
| 2017/0065766 A1 | 3/2017 | Olson et al. |
| 2017/0098044 A1 | 4/2017 | Lai et al. |
| 2017/0119607 A1 | 5/2017 | Derenne et al. |
| 2017/0281440 A1 | 10/2017 | Puvogel et al. |
| 2019/0123597 A1 | 4/2019 | Patmore et al. |
| 2019/0123598 A1 | 4/2019 | Patmore et al. |
| 2021/0167640 A1 | 6/2021 | Patmore et al. |
| 2022/0123606 A1 | 4/2022 | Patmore et al. |

FOREIGN PATENT DOCUMENTS

| | | |
|---|---|---|
| CA | 2187727 | 4/1997 |
| CA | 2187727 A1 | 4/1997 |
| CN | 104097531 | 10/2014 |
| CN | 104097531 A | 10/2014 |
| EP | 0315210 | 5/1989 |
| EP | 0315210 B1 | 7/1994 |
| EP | 0700574 | 3/1996 |
| EP | 0700574 B1 | 7/1997 |
| WO | 8903665 A1 | 5/1989 |
| WO | WO8903665 | 5/1989 |
| WO | 9100054 A1 | 1/1991 |
| WO | WO9100054 | 1/1991 |
| WO | 9428560 A1 | 12/1994 |
| WO | WO9428560 | 12/1994 |
| WO | 9620754 A1 | 7/1996 |
| WO | WO9620754 | 7/1996 |
| WO | 2004038890 A1 | 5/2004 |
| WO | WO2004038890 | 5/2004 |
| WO | 2005016216 A2 | 2/2005 |
| WO | WO2005016216 | 2/2005 |
| WO | 2005077102 A2 | 8/2005 |
| WO | WO2005077102 | 8/2005 |
| WO | 2007063500 A2 | 6/2007 |
| WO | 2007064609 A1 | 6/2007 |
| WO | WO2007063500 | 6/2007 |
| WO | WO2007064609 | 6/2007 |
| WO | 2007118221 A2 | 10/2007 |
| WO | WO2007118221 | 10/2007 |
| WO | 2007136733 A2 | 11/2007 |
| WO | WO2007136733 | 11/2007 |
| WO | 2008003027 A2 | 1/2008 |
| WO | WO2008003027 | 1/2008 |
| WO | 2008036087 A1 | 3/2008 |
| WO | WO2008036087 | 3/2008 |
| WO | 2008050260 A1 | 5/2008 |
| WO | 2008050292 A2 | 5/2008 |
| WO | 2008055664 A2 | 5/2008 |
| WO | WO2008050260 | 5/2008 |
| WO | WO2008050292 | 5/2008 |
| WO | WO2008055664 | 5/2008 |
| WO | 2008150448 A1 | 12/2008 |
| WO | WO2008150448 | 12/2008 |
| WO | WO2009009296 | 1/2009 |
| WO | 2009009296 A3 | 3/2009 |
| WO | 2009055203 A1 | 4/2009 |
| WO | 2009055432 A2 | 4/2009 |
| WO | WO2009055203 | 4/2009 |
| WO | WO2009055432 | 4/2009 |
| WO | 2009120970 A2 | 10/2009 |
| WO | 2009123780 A1 | 10/2009 |
| WO | WO2009120970 | 10/2009 |
| WO | WO2009123780 | 10/2009 |
| WO | 2009135081 A2 | 11/2009 |
| WO | WO2009135081 | 11/2009 |

(56) References Cited

FOREIGN PATENT DOCUMENTS

| | | |
|---|---|---|
| WO | 2010027282 A2 | 3/2010 |
| WO | WO2010027282 | 3/2010 |
| WO | 2010036980 A1 | 4/2010 |
| WO | WO2010036980 | 4/2010 |
| WO | 2010059096 A1 | 5/2010 |
| WO | 2010059097 A1 | 5/2010 |
| WO | WO2010059096 | 5/2010 |
| WO | WO2010059097 | 5/2010 |
| WO | 2010093997 A1 | 8/2010 |
| WO | WO2010093997 | 8/2010 |
| WO | 2011096111 A1 | 8/2011 |
| WO | WO2011096111 | 8/2011 |
| WO | 2011113070 A1 | 9/2011 |
| WO | WO2011113070 | 9/2011 |
| WO | 2011156768 A2 | 12/2011 |
| WO | WO2011156768 | 12/2011 |
| WO | 2012087807 A2 | 6/2012 |
| WO | WO2012087807 | 6/2012 |
| WO | 2012100219 A1 | 7/2012 |
| WO | WO2012100219 | 7/2012 |
| WO | 2012122002 A1 | 9/2012 |
| WO | WO2012122002 | 9/2012 |
| WO | 2012135118 A1 | 10/2012 |
| WO | WO2012135118 | 10/2012 |
| WO | 2012170278 A2 | 12/2012 |
| WO | WO2012170278 | 12/2012 |
| WO | 2013006845 A2 | 1/2013 |
| WO | 2013009881 A2 | 1/2013 |
| WO | WO2013006845 | 1/2013 |
| WO | WO2013009881 | 1/2013 |
| WO | WO2013044165 | 3/2013 |
| WO | 2013049979 A1 | 4/2013 |
| WO | 2013050699 A1 | 4/2013 |
| WO | WO2013049979 | 4/2013 |
| WO | WO2013050699 | 4/2013 |
| WO | 2013044165 A3 | 5/2013 |
| WO | 2013062808 A1 | 5/2013 |
| WO | 2013062809 A2 | 5/2013 |
| WO | 2013072306 A1 | 5/2013 |
| WO | 2013074452 A2 | 5/2013 |
| WO | 2013078092 A1 | 5/2013 |
| WO | WO2013062808 | 5/2013 |
| WO | WO2013062809 | 5/2013 |
| WO | WO2013072306 | 5/2013 |
| WO | WO2013074452 | 5/2013 |
| WO | WO2013078092 | 5/2013 |
| WO | 2013112782 A2 | 8/2013 |
| WO | 2013123119 A1 | 8/2013 |
| WO | 2013124840 A1 | 8/2013 |
| WO | WO2013112782 | 8/2013 |
| WO | WO2013123119 | 8/2013 |
| WO | 2013131078 A1 | 9/2013 |
| WO | 2013142840 A1 | 9/2013 |
| WO | WO2013131078 | 9/2013 |
| WO | WO2013142840 | 9/2013 |
| WO | 2013156907 A2 | 10/2013 |
| WO | 2013158675 A1 | 10/2013 |
| WO | WO2013156907 | 10/2013 |
| WO | WO2013158675 | 10/2013 |
| WO | 2014014581 A2 | 1/2014 |
| WO | WO2014014581 | 1/2014 |
| WO | 2014043659 A1 | 3/2014 |
| WO | 2014046844 A1 | 3/2014 |
| WO | WO2014043659 | 3/2014 |
| WO | WO2014046844 | 3/2014 |
| WO | 2014052147 A2 | 4/2014 |
| WO | 2014052148 A2 | 4/2014 |
| WO | WO2014052147 | 4/2014 |
| WO | WO2014052148 | 4/2014 |
| WO | 2014078667 A1 | 5/2014 |
| WO | WO2014078667 | 5/2014 |
| WO | 2014097055 A1 | 6/2014 |
| WO | WO2014097055 | 6/2014 |
| WO | 2014113164 A1 | 7/2014 |
| WO | WO2014113164 | 7/2014 |
| WO | 2014150970 A1 | 9/2014 |
| WO | 2014151577 A1 | 9/2014 |
| WO | WO2014150970 | 9/2014 |
| WO | WO2014151577 | 9/2014 |
| WO | 2014164248 A1 | 10/2014 |
| WO | WO2014164248 | 10/2014 |
| WO | 2015010702 A1 | 1/2015 |
| WO | WO2015010702 | 1/2015 |
| WO | 2015106239 A1 | 7/2015 |
| WO | 2015108653 A1 | 7/2015 |
| WO | WO2015106239 | 7/2015 |
| WO | WO2015108653 | 7/2015 |
| WO | 2015148578 A2 | 10/2015 |
| WO | WO2015148578 | 10/2015 |
| WO | 2015191819 A1 | 12/2015 |
| WO | WO2015191819 | 12/2015 |
| WO | 2016090384 A2 | 6/2016 |
| WO | WO2016090384 | 6/2016 |
| WO | 2016167594 A1 | 10/2016 |
| WO | WO2016167594 | 10/2016 |
| WO | 2016179562 A1 | 11/2016 |
| WO | WO2016179562 | 11/2016 |
| WO | 2017025735 A1 | 2/2017 |
| WO | WO2017025735 | 2/2017 |
| WO | 2017040317 A1 | 3/2017 |
| WO | WO2017040317 | 3/2017 |

OTHER PUBLICATIONS

Daily Mail Reporter, "Move over Fred Flintstone: The human-powered car that can reach speeds of up to 60mph", http://www.dailymail.co.uk/motoring/article-1304120/The-human-powered-car-reach-speeds-60mph.html, Aug. 19, 2010, 5 Pages.

English language abstract and machine-assisted English translation for CN 104097531 extracted from espacenet.com database on Jan. 10, 2019, 6 pages.

English language abstract and machine-assisted English translation for WO 2013/072306 extracted from espacenet.com database on Jan. 10, 2019, 14 pages.

English language abstract and machine-assisted English translation for WO 91/00054 extracted from espacenet.com database on Jan. 14, 2019, 11 pages.

English language abstract for WO 2008/055664 extracted from espacenet.com database on Jan. 14, 2019, 2 pages.

English language abstract for WO 2011/096111 and machine-assisted English translation for CN 102812617, an equivalent of WO 2011/096111, extracted from espacenet.com database on Jan. 10, 2019, 22 pages.

English language abstract for WO 2013/049979 extracted from espacenet.com database on Jan. 10, 2019, 1 page.

English language abstract for WO 2013/050699 extracted from espacenet.com database on Jan. 14, 2019, 1 page.

English language abstract not found for AU 2008316723; however, see English language equivalent U.S. Pat. No. 9,734,293. Original document extracted from espacenet.com databasse on Jan. 10, 2019, 1 page.

EZ-Wheel, "La Premiere Roue Electrique Autonome-Integrant Moteur and Batteries Brochure", http://www.ez-wheel.com, 2017, 8 pages.

Stryker SA, "Prime TC Transport Chair Brochure", 2013, 8 pages.

U.S. Appl. No. 16/168,089, filed Oct. 23, 2018.

Youtube "Tesla Charging Snake Video", Aug. 6, 2015, https://www.youtube.com/watch?v=ut3sELMOyTM, 3 pages.

* cited by examiner

POWER TRANSFER SYSTEM WITH PATIENT SUPPORT APPARATUS AND POWER TRANSFER DEVICE TO TRANSFER POWER TO THE PATIENT SUPPORT APPARATUS

CROSS-REFERENCE TO RELATED APPLICATIONS

The subject patent application is a Continuation of U.S. patent application Ser. No. 16/168,170, filed on Oct. 23, 2018, which claims priority to and all the benefits of U.S. Provisional Patent Application No. 62/576,309, filed on Oct. 24, 2017, the disclosures of each of which are hereby incorporated by reference in their entirety.

BACKGROUND

Patient support apparatuses, such as hospital beds, stretchers, cots, tables, wheelchairs, and chairs facilitate care of patients in a health care setting. Conventional patient support apparatuses comprise several electrically powered devices to carry out desired functions in caring for the patient. When the patient support apparatus is located in a patient room, for instance, the patient support apparatus is connected to a fixed power source, such as conventional wall outlet power, to provide energy to these electrically powered devices. Usually, a power cord is required to connect the patient support apparatus to the wall outlet power. The patient support apparatus also typically carries one or more batteries to provide energy to the electrically powered devices when the patient support apparatus is unable to connect to the wall outlet power, such as during transport or when located outside of the patient room.

Patient care increasingly demands more and more attention from caregivers and any activities that distract the caregiver from the patient are undesirable—one such activity is plugging the power cord from the patient support apparatus into the wall outlet power. Wireless power transfer methods have been suggested to simplify connecting to a power source. However, owing to the large (and often unwieldy) nature of many patient support apparatuses, caregivers will likely have trouble aligning a wireless power receiver on the patient support apparatus with a wireless power transmitter located in the patient's room. For instance, the caregiver may not have good line-of-sight to both the wireless power transmitter and the wireless power receiver and may be unable to visualize when alignment is achieved. Good alignment may be desirable to ensure efficient power transfer.

A power transfer system with a patient support apparatus and power transfer device designed to overcome one or more of the aforementioned disadvantages is desired.

DETAILED DESCRIPTION

Figure 1:
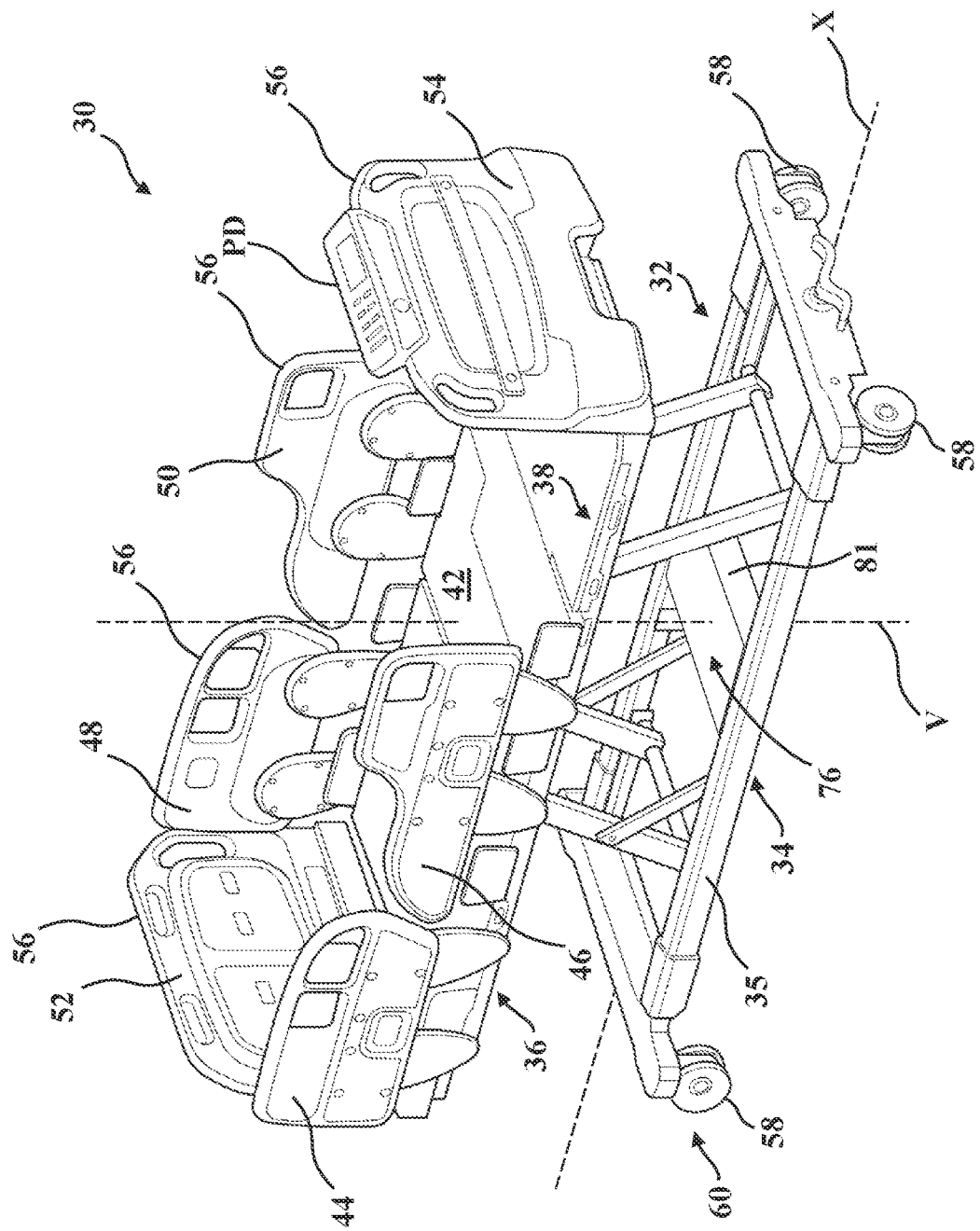
FIG. 1 is perspective view of a patient support apparatus with a power receiver assembly mounted to a base.

Referring to FIG. 1, a patient support apparatus 30 is shown for supporting a patient in a health care setting. The patient support apparatus 30 illustrated in FIG. 1 comprises a hospital bed. In other embodiments, however, the patient support apparatus 30 may comprise a stretcher, cot, table, wheelchair, chair, or similar apparatus utilized in the care of a patient.

A support structure 32 provides support for the patient. The support structure 32 illustrated in FIG. 1 comprises a base 34 and a support frame 36. The base 34 comprises a base frame 35. The support frame 36 is spaced above the base frame 35 in FIG. 1. The support structure 32 also comprises a patient support deck 38 disposed on the support frame 36. The patient support deck 38 comprises several sections, some of which are capable of articulating (e.g., pivoting) relative to the support frame 36, such as a fowler section, a seat section, a thigh section, and a foot section. The patient support deck 38 provides a patient support surface 42 upon which the patient is supported.

A mattress (not shown) is disposed on the patient support deck 38 during use. The mattress comprises a secondary patient support surface upon which the patient is supported. The base 34, support frame 36, patient support deck 38, and patient support surfaces 42 each have a head end and a foot end corresponding to a designated placement of the patient's head and feet on the patient support apparatus 30. The base 34 comprises a longitudinal axis X along its length from the head end to the foot end. The base 34 also comprises a vertical axis V arranged crosswise (e.g., perpendicularly) to the longitudinal axis X along which the support frame 36 is lifted and lowered relative to the base 34. The construction of the support structure 32 may take on any known or conventional design, and is not limited to that specifically set forth above. In addition, the mattress may be omitted in certain embodiments, such that the patient rests directly on the patient support surface 42.

Side rails 44, 46, 48, 50 are coupled to the support frame 36 and thereby supported by the base 34. A first side rail 44 is positioned at a right head end of the support frame 36. A second side rail 46 is positioned at a right foot end of the support frame 36. A third side rail 48 is positioned at a left head end of the support frame 36. A fourth side rail 50 is positioned at a left foot end of the support frame 36. If the patient support apparatus 30 is a stretcher or a cot, there may be fewer side rails. The side rails 44, 46, 48, 50 are movable between a raised position in which they block ingress and egress into and out of the patient support apparatus 30, one or more intermediate positions, and a lowered position in which they are not an obstacle to such ingress and egress. In still other configurations, the patient support apparatus 30 may not include any side rails.

A headboard 52 and a footboard 54 are coupled to the support frame 36. In other embodiments, when the headboard 52 and footboard 54 are included, the headboard 52 and footboard 54 may be coupled to other locations on the patient support apparatus 30, such as the base 34. In still other embodiments, the patient support apparatus 30 does not include the headboard 52 and/or the footboard 54.

Caregiver interfaces 56, such as handles, are shown integrated into the footboard 54 and side rails 44, 46, 48, 50 to facilitate movement of the patient support apparatus 30 over floor surfaces. Additional caregiver interfaces 56 may be integrated into the headboard 52 and/or other components of the patient support apparatus 30. The caregiver interfaces 56 are graspable by the caregiver to manipulate the patient support apparatus 30 for movement.

Other forms of the caregiver interface 56 are also contemplated. The caregiver interface may comprise one or more handles coupled to the support frame 36. The caregiver interface may simply be a surface on the patient support apparatus 30 upon which the caregiver logically applies force to cause movement of the patient support apparatus 30 in one or more directions, also referred to as a push location. This may comprise one or more surfaces on the support frame 36 or base 34. This could also comprise one or more surfaces on or adjacent to the headboard 52, footboard 54, and/or side rails 44, 46, 48, 50. In other embodiments, the caregiver interface may comprise separate handles for each hand of the caregiver. For example, the caregiver interface may comprise two handles.

Wheels 58 are coupled to the base 34 to facilitate transport over the floor surfaces. The wheels 58 are arranged in each of four quadrants of the base 34 adjacent to corners of the base 34. In the embodiment shown, the wheels 58 are caster wheels able to rotate and swivel relative to the support structure 32 during transport. Each of the wheels 58 forms part of a caster assembly 60. Each caster assembly 60 is mounted to the base 34. It should be understood that various configurations of the caster assemblies 60 are contemplated. In addition, in some embodiments, the wheels 58 are not caster wheels and may be non-steerable, steerable, non-powered, powered, or combinations thereof. Additional wheels are also contemplated. For example, the patient support apparatus 30 may comprise four non-powered, non-steerable wheels, along with one or more powered wheels. In some cases, the patient support apparatus 30 may not include any wheels.

In other embodiments, one or more auxiliary wheels (powered or non-powered), which are movable between stowed positions and deployed positions, may be coupled to the support structure 32. In some cases, when these auxiliary wheels are located between caster assemblies 60 and contact the floor surface in the deployed position, they cause two of the caster assemblies 60 to be lifted off the floor surface thereby shortening a wheel base of the patient support apparatus 30. A fifth wheel may also be arranged substantially in a center of the base 34.

The patient support apparatus 30 comprises one or more electrically powered devices PD (see FIG. 8) that are employed to perform one or more functions of the patient support apparatus 30 in caring for the patient. Such powered devices PD may comprise, for example, electric actuators, electric motors, electronic displays, electronic user interfaces, electronic therapy devices, communication devices, lighting systems, and the like. When the patient support apparatus 30 is stationary for long periods of time, such as when the patient support apparatus 30 is located in a patient room, a fixed power source FPS may be employed to provide energy to the powered devices PD. The fixed power source FPS may be conventional facility power routed in a network throughout a facility, such as a hospital. An energy storage device B (see FIG. 8) is located on the patient support apparatus 30 to store energy utilized to power these powered devices PD, particularly when the patient support apparatus 30 is being transported away from the patient room. The energy storage device B may comprise batteries, capacitors, and the like. The energy storage device B requires charging from time-to-time via the fixed power source FPS or a mobile power source, as described further below.

Figure 2:
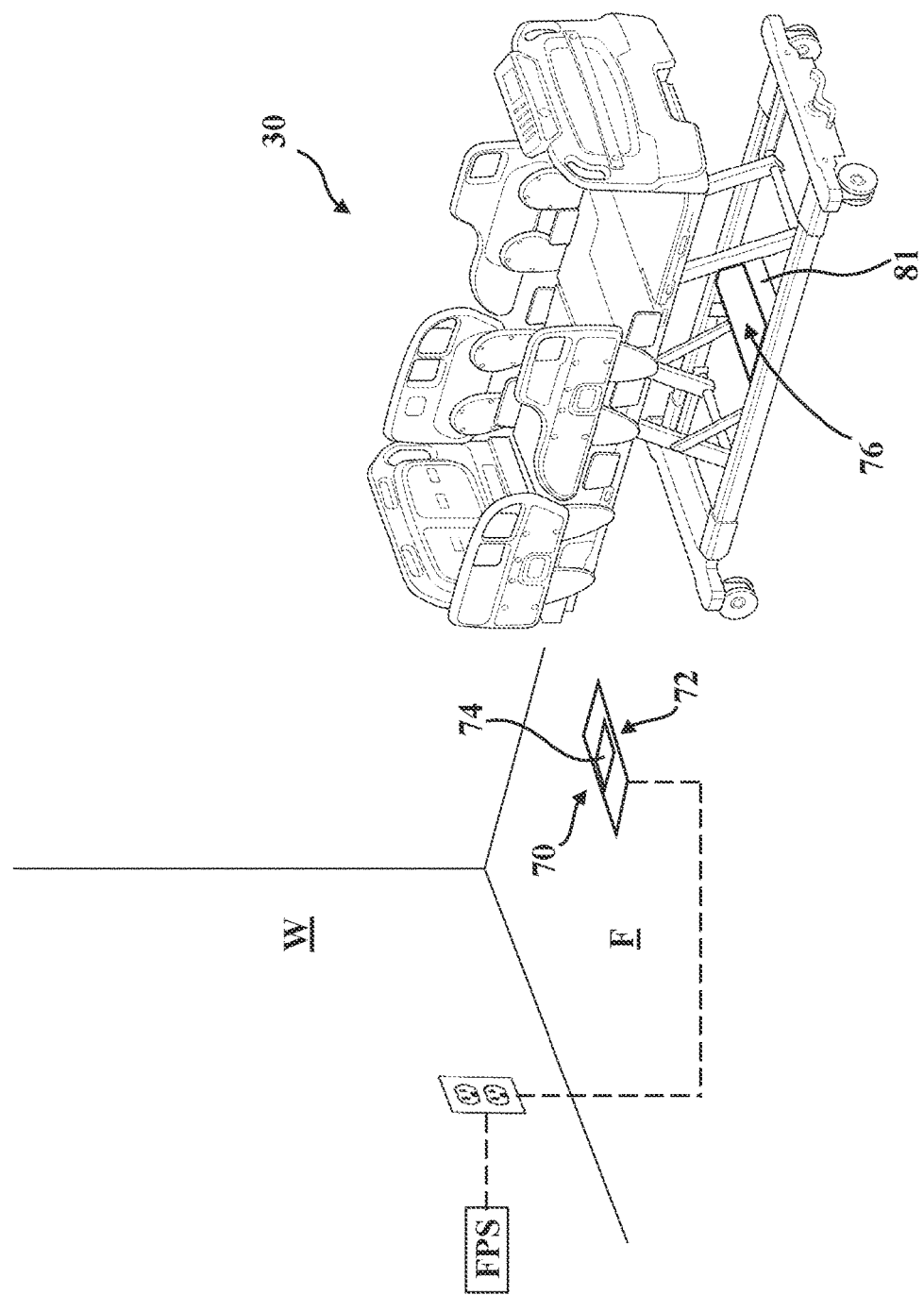
FIG. 2 is an illustration of the patient support apparatus in relation to a power transfer device located in a floor.
Figure 3:
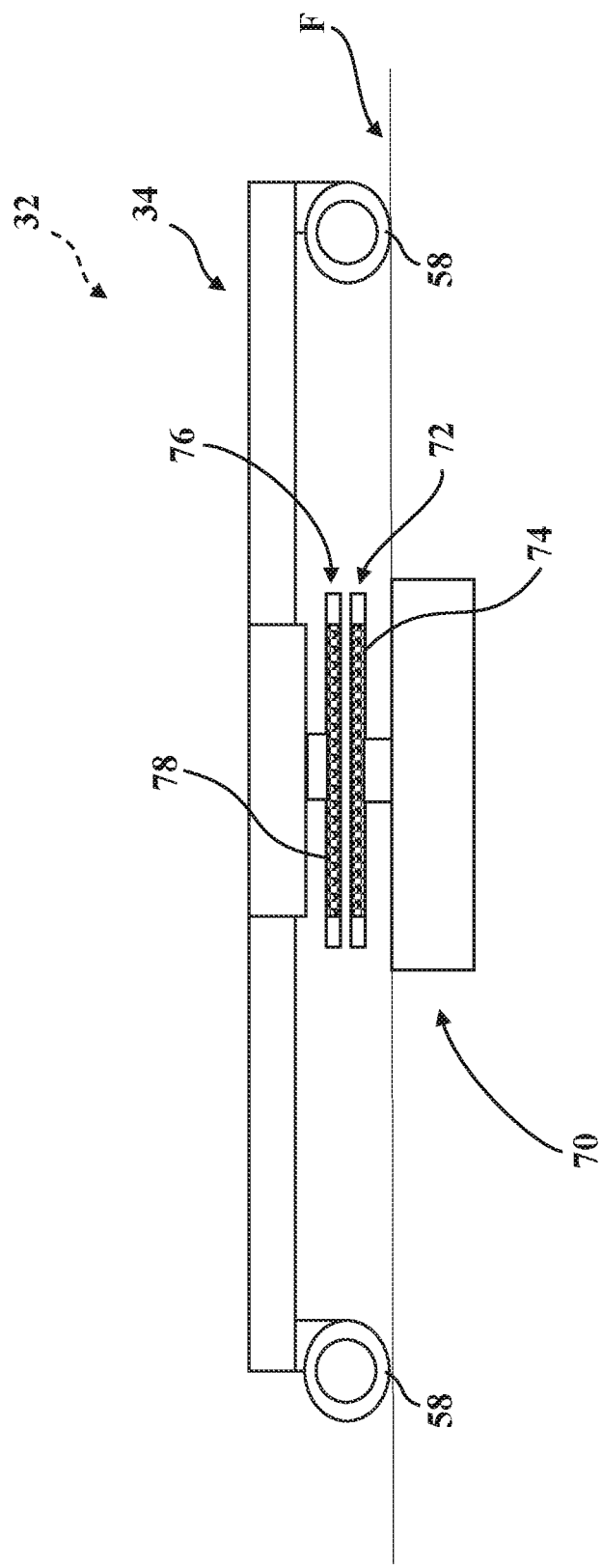
FIG. 3 is a side elevational view of the power receiver assembly of the patient support apparatus and a power transmitter assembly of the power transfer device.

As shown in FIG. 2, a power transfer system transfers energy from the fixed power source FPS to the patient support apparatus 30. The power transfer system comprises a power transfer device 70 provided to transfer power to a power receiver assembly 76 on the patient support apparatus 30. Referring to FIG. 3, the power transfer device 70 comprises a power transmitter assembly 72 with a power transmitter 74 configured to transfer power to the power receiver assembly 76. The power receiver assembly 76 comprises a power receiver 78. The power transmitter 74 is coupled to the fixed power source FPS and the power receiver 78 is coupled to the powered devices PD and the energy storage device B on the patient support apparatus 30 (see FIG. 8). In one embodiment, the power transmitter 74 is configured to transfer power wirelesssly to the power receiver 78, such as through inductive coupling.

The power transmitter 74 may comprise one or more coils and the power receiver 78 may comprise one or more coils. The coils of the power transmitter 74 create a magnetic field that, when the coils of the power receiver 78 are positioned nearby, creates electrical current within the coils of the power receiver 78 and within any electrical connections to the power receiver 78. The patient support apparatus 30 harnesses the electrical energy inductively generated within the coils of the power receiver 78 for providing electrical power to the electrically powered devices PD directly or indirectly, such as through the energy storage device B.

Various sizes, shapes, and types of coils of the power transmitter 74 and/or the power receiver 78 are contemplated.

Figure 6:
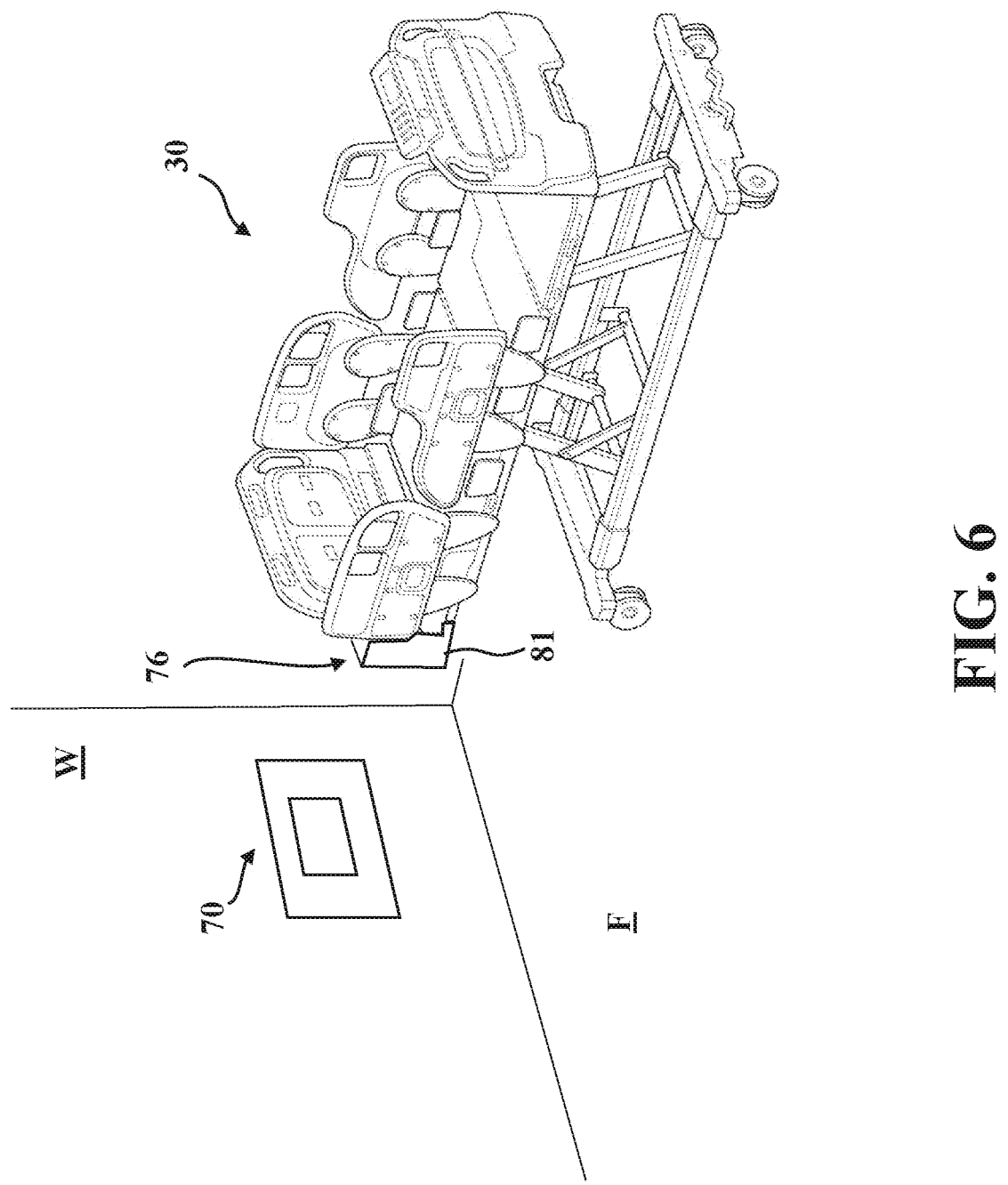
FIG. 6 is an illustration of the patient support apparatus of FIG. 5 in relation to an alternative power transfer device located in a wall.
Figure 7:
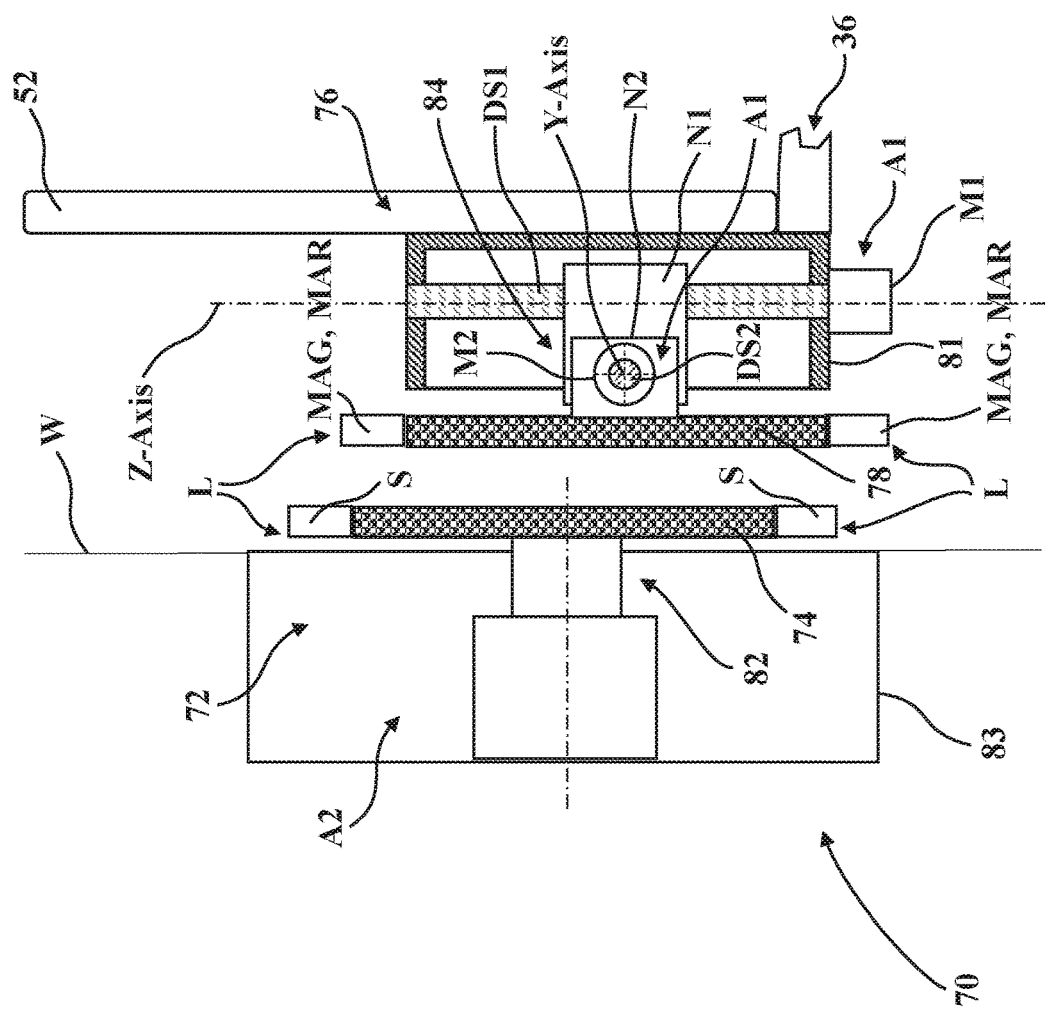
FIG. 7 is a partial sectional view of the power receiver assembly and a power transmitter assembly of the power transfer device of FIG. 6.

In the embodiment shown in FIG. 3, the power receiver 78 is coupled to the base 34 of the support structure 32. However, the power receiver 78 may be located at any suitable location on the patient support apparatus 30. In FIG. 6, the power receiver 78 is mounted to the support frame 36. The power transfer device 70 is located in the floor adjacent to the floor surface F in FIG. 3 so that the power transmitter 74 is extendable/retractable with respect to the floor surface F. However, the power transfer device 70 may be located at any suitable location to transfer power to the power receiver 78. In FIGS. 6 and 7, the power transfer device 70 is located in a wall adjacent to a wall surface W.

Figure 4:
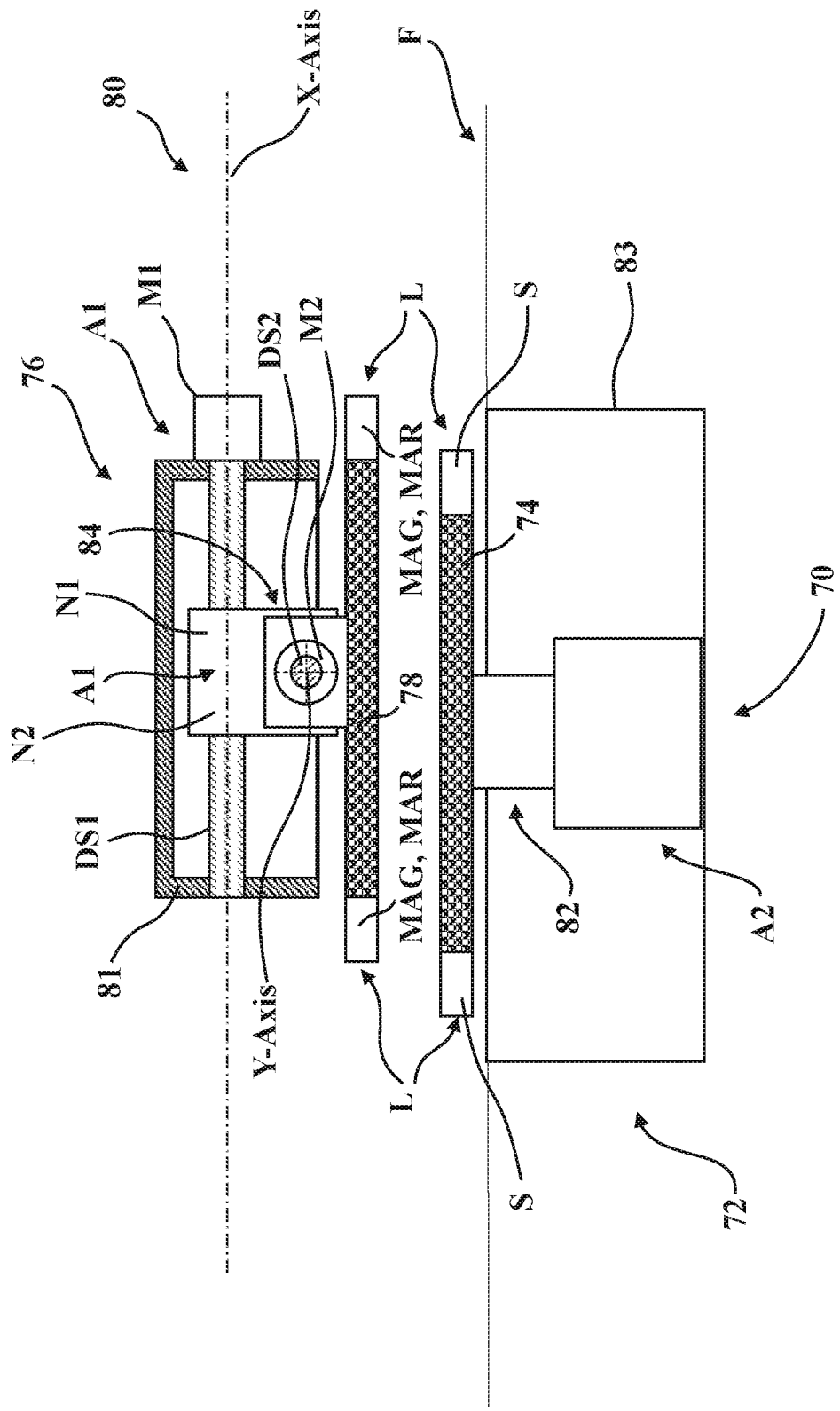
FIG. 4 is a partial sectional view of the power transmitter assembly and the power receiver assembly illustrating actuators that move a power transmitter and/or power receiver to align the power transmitter with the power receiver.
Figure 8:
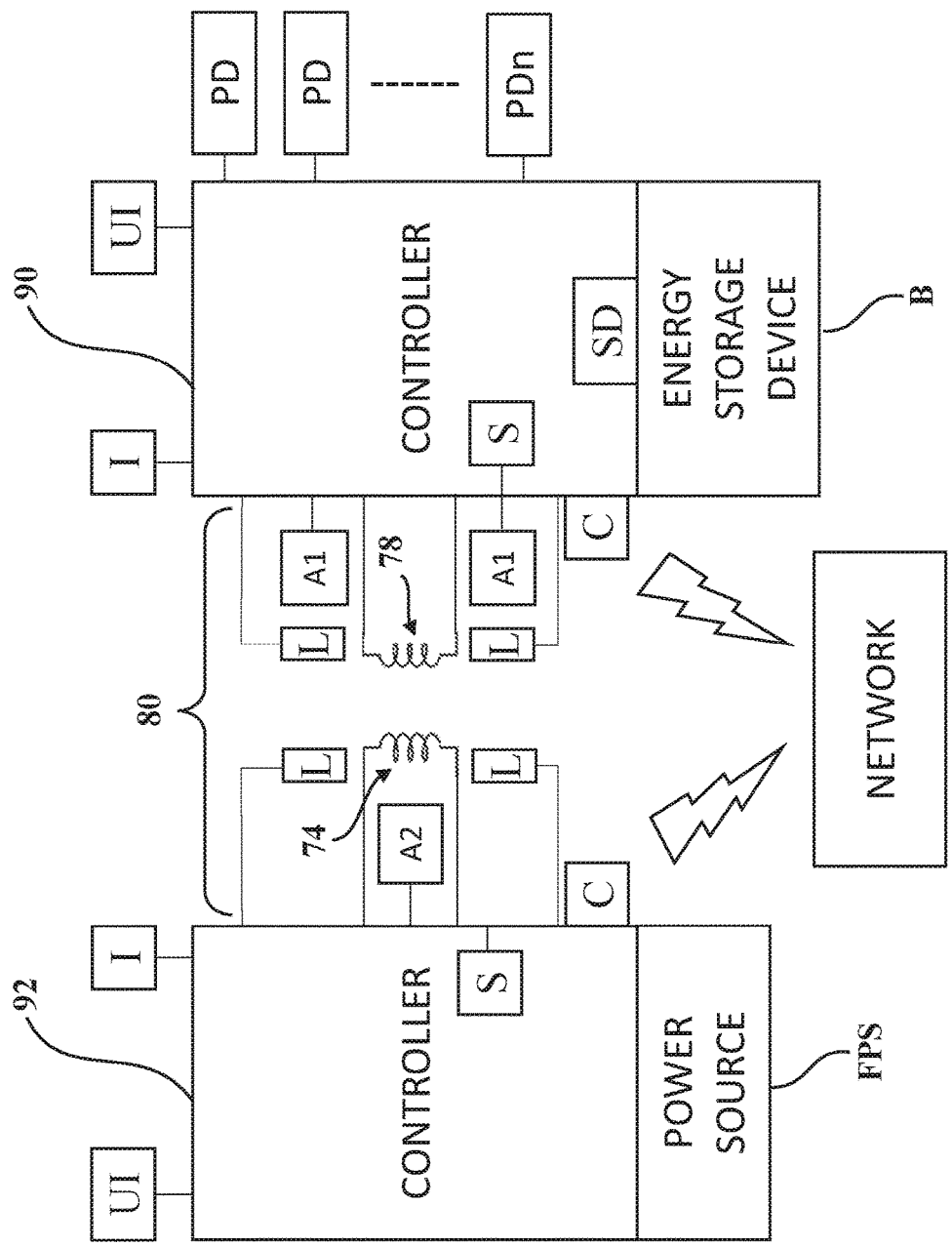
FIG. 8 is a schematic view of a control system.

Referring to FIGS. 3, 4, and 8, an alignment system 80 is provided to align the power transmitter 74 with the power receiver 78 so that efficient energy transfer occurs from the power transmitter 74 to the power receiver 78. Alignment may comprise any alignment between the power transmitter 74 and the power receiver 78, such as vertical alignment, longitudinal alignment, lateral alignment, combinations thereof, and the like. Alignment may also comprise distance alignment, e.g., placing the power transmitter 74 within a desired distance of the power receiver 78 and/or may comprise orientation alignment so that the coils of the power receiver 78 are in a desired orientation to the coils of the power transmitter 74. Other forms of alignment are also contemplated. In some cases, the distance between the coils of the power transmitter 74 and coils of the power receiver 78 is desired to be less than a wavelength of the frequency used for inductive coupling to ensure effective energy transfer. Orientations in which a large amount of magnetic field passes through the coils of the power receiver 78 may be desired for high energy transfer efficiency.

Referring to FIGS. 3 and 4, the alignment system 80 comprises a first carrier 82 coupled to the power transmitter 74 and a second carrier 84 coupled to the power receiver 78. The alignment system 80 further comprises one or more actuators A1, A2 arranged to move one or both of the carriers 82, 84 relative to housings 81, 83 to align the power transmitter 74 and the power receiver 78 in any manner previously described. The actuators A1, A2 may be electric, hydraulic, pneumatic, or combinations thereof. The actuators A1, A2 may be rotary actuators, linear actuators, and the like. In the embodiment of FIGS. 2-8, the carriers 82, 84 are movable relative to the support structure 32, the floor surface F, and/or the wall surface W to align the power transmitter 74 and the power receiver 78.

Two actuators A1 are shown in FIG. 4 coupled to the power receiver 78 to move the power receiver 78 along longitudinal and/or lateral axes (x and y axes), respectively, during alignment. Each of these actuators A1 comprises a motor M1, M2, a drive screw DS1, DS2 rotatably driven by the motor M1, M2, and a nut N1, N2 threadably received on the drive screw DS1, D2 to slide along the drive screw DS1, DS2. The nuts N1, N2 are constrained from rotation so that they translate along the drive screws DS1, DS2 during actuation to adjust the x, y position of the power receiver 78 (x position adjusted by moving to left and right in FIG. 4 and y position adjusted by moving into/out of FIG. 4).

In the example shown, a first drive screw DS1 is rotatably supported in the housing 81 (via bearings) to adjust the x position of the second carrier 84. A first nut N1 translates along the first drive screw DS1 upon operation of a first motor M1. A second nut N2, second motor M2, and second drive screw DS2 are carried by the first nut N1 during translation of the first nut N1 along the x-axis. The second nut N2 translates along the second drive screw DS2 upon operation of the second motor M2. In this embodiment, the carrier 84 comprises the second nut N2, which moves in both x and y directions. In some embodiments, only the x and/or y positions are adjusted during alignment.

One actuator A2 is configured to move the power transmitter 74 relative to the floor surface F, such as by extending/retracting the power transmitter 74 with respect to the housing 83. This actuator A2 may retract the power transmitter 74 completely into the floor at or beneath the floor surface F so that the power transmitter 74 avoids collisions with the wheels 58 of the patient support apparatus 30. The first carrier 82 comprises a post and the actuator A2 extends/retracts the post to extend/retract the power transmitter 74 relative to the power receiver 78 to transfer power. The actuator A2 comprises an electric linear actuator in the embodiment shown having a casing fixed to the housing 83 and the post extends/retracts relative to the housing 83 during actuation. It should be appreciated that the actuators A1 could be used to move the power transmitter 74 and the actuator A2 could be used to move the power receiver 78. Other combinations, types, and arrangements of actuators are possible.

Figure 5:
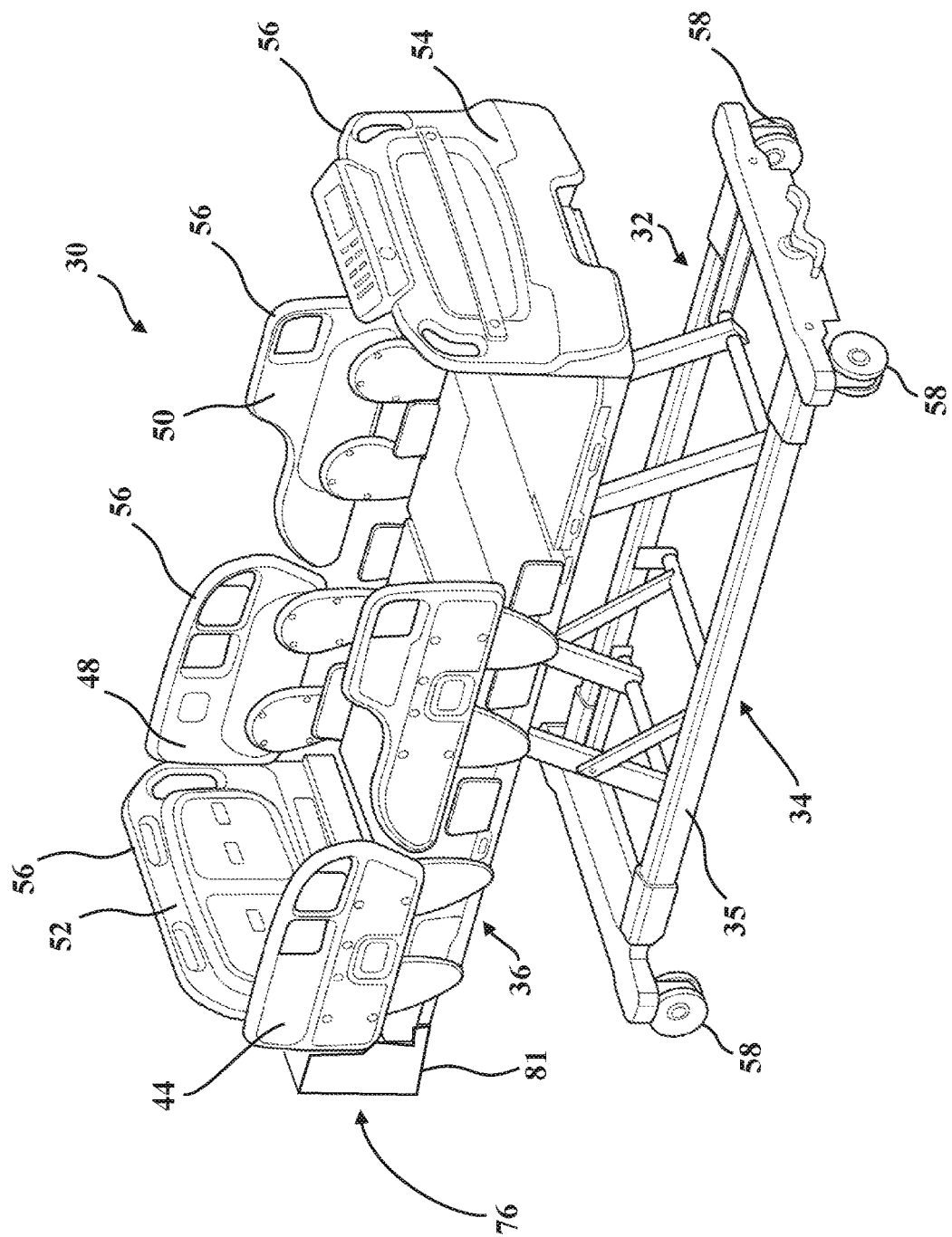
FIG. 5 is a perspective view of an alternative patient support apparatus with a power receiver assembly coupled to a support frame.

In the embodiment shown in FIGS. 5 through 7, the power receiver 78 is mounted to the support frame 36 adjacent to the headboard 52 and the power transfer device 70 is located in the wall adjacent to the wall surface W. In this embodiment, referring to FIG. 7, two actuators A1 are coupled to the power receiver 78 to move the power receiver 78 along vertical and/or lateral axes (z and y axes), respectively, during alignment. These actuators A1 operate in the same manner described in FIG. 4. One actuator A2 is configured to move the power transmitter 74 relative to the wall surface W, such as extending/retracting the power transmitter 74 with respect the wall surface W. This actuator A2 operates in the same manner described in FIG. 4. This actuator A2 may retract the power transmitter 74 completely into the wall at or beneath the wall surface W so that the power transmitter 74 avoids collisions with the patient support apparatus 30 or other equipment moving in the patient room. The power transmitter 74 comprises a post attached to the first carrier 82 and the actuator A2 extends and retracts the post to extend/retract the power transmitter 74 relative to the power receiver 78 to transfer power.

Referring to FIG. 8, a control system is provided to control operation of the patient support apparatus 30 and the power transfer device 70. The control system comprises an apparatus controller 90 and a power transfer controller 92. Each of the controllers 90, 92 have one or more microprocessors, microcontrollers, field programmable gate arrays, systems on a chip, discrete circuitry, and/or other suitable hardware, software, or firmware that is capable of carrying out the functions described herein. The controllers 90, 92 may communicate with a network via one or more communication devices C, which may be wireless transceivers that communicate via one or more known wireless communication protocols such as WiFi, Bluetooth, Zigbee, and the like. Wired communication is also contemplated. Additionally, the controllers 90, 92 may communicate with each other via the communication devices C such that the apparatus controller 90 could be configured to carry out all the functions of the power transfer controller 92 described herein, and vice versa. In some cases, only a single controller is needed to perform the functions recited herein.

The apparatus controller 90 may be carried on-board the patient support apparatus 30, or may be remotely located. In one embodiment, the apparatus controller 90 is mounted to the base 34. In other embodiments, the apparatus controller 90 is mounted to the footboard 54. The apparatus controller 90 is coupled to the powered devices PD in a manner that allows the apparatus controller 90 to control the powered devices PD (connections shown schematically in FIG. 8). The apparatus controller 90 is also coupled to the power receiver assembly 76 to control operation of the power receiver 78 and the actuators A1 coupled to the power receiver 78. The apparatus controller 90 may communicate with the powered devices PD, actuators A1, and/or power receiver 78 via wired or wireless connections to perform one of more desired functions. The power transfer controller 92 is coupled to the power transmitter assembly 72 to control operation of the power transmitter 74 and the actuator A2 coupled to the power transmitter 74. The power transfer controller 92 may communicate with the actuator A2 and the power transmitter 74 via wired or wireless connections to perform one or more desired functions.

The controllers 90, 92 are configured to process instructions or to process algorithms stored in memory to control operation of the actuators A1, A2, the power transmitter 74, and/or the power receiver 78 to align the power transmitter 74 and the power receiver 78. The controllers 90, 92 may be configured to move only one of the power transmitter 74 and power receiver 78, or to move both of the power transmitter 74 and power receiver 78. The controllers 90, 92 and actuators A1, A2 may move the power transmitter 74 and/or the power receiver 78 in one degree of freedom, two degrees of freedom, three degrees of freedom, or more degrees of freedom relative to each other.

The controllers 90, 92 may monitor a current state of the actuators A1, A2 and determine desired states in which the actuators A1, A2 should be placed, based on one or more input signals that the controllers 90, 92 receive from one or more input devices, such as from a sensor system comprising sensors S integrated into the actuators A1, A2. The state of the actuators A1, A2 may be a position, a relative position, an angle, an energization status (e.g., on/off), or any other parameter of the actuators A1, A2. The sensors S also provide input to the controllers 90, 92 associated with various states of the patient support apparatus 30 and the power transfer device 70. For instance, a sensor S may be provided to determine if energy is being actively transferred from the power transmitter 74 to the power receiver 78. The sensors S may comprise potentiometers, optical sensors, hall-effect sensors, encoders, accelerometers, gyroscopes, inclinometers, electric circuits, resistors, coils, etc.

The user, such as a caregiver, may actuate a user input device UI (see FIG. 8), which transmits a corresponding input signal to the apparatus controller 90 and/or the transfer controller 92 to initiate power transfer from the power transmitter 74 to the power receiver 78. The user input devices UI may comprise any device capable of being actuated by the user. The user input devices UI may be configured to be actuated in a variety of different ways, including but not limited to, mechanical actuation (hand, foot, finger, etc.), hands-free actuation (voice, foot, etc.), and the like. The patient support apparatus 30 may also comprise user input devices UI to actuate the powered devices PD. The user input devices UI may comprise buttons, such as separate buttons corresponding to lift, lower, Trendelenburg, reverse Trendelenburg, raise back section, lower back section, raise leg section, lower leg section, raise foot section, lower foot section, etc.

The user input devices UI may also comprise a gesture sensing device for monitoring motion of hands, feet, or other body parts of the user (such as through a camera), a microphone for receiving voice activation commands, a foot pedal, and a sensor (e.g., infrared sensor such as a light bar or light beam to sense a user's body part, ultrasonic sensor, etc.). Additionally, the buttons/pedals can be physical buttons/pedals or virtually implemented buttons/pedals such as through optical projection or on a touchscreen. The buttons/pedals may also be mechanically connected or drive-by-wire type buttons/pedals where a user applied force actuates a sensor, such as a switch or potentiometer. It should be appreciated that any combination of user input devices I may also be utilized. The user input devices UI may be located on one of the side rails 44, 46, 48, 50, the headboard 52, the footboard 54, or other suitable locations. The user input devices UI may also be located on a portable electronic device (e.g., iWatch®, iPhone®, iPad®, or similar electronic devices).

Locators L may be coupled to the alignment system 80 and configured to locate one or more of the power receiver 78 and the power transmitter 74 to facilitate alignment of the power transmitter 74 and the power receiver 78 via the actuators A1, A2. The locators L may comprise sensors coupled to the alignment system 80 and configured to sense the one or more of the power receiver 78 and the power transmitter 74 to facilitate alignment of the power transmitter 74 and the power receiver 78. More specifically, the controllers 90, 92 utilize signals from the locators L as feedback to control operation of the actuators A1, A2 to achieve desired alignment of the power transmitter 74 and the power receiver 78.

Referring back to FIG. 4, for example, the locators L may comprise hall-effect sensors S and corresponding magnets MAG wherein the hall-effect sensors S generate variable signals based on the relative alignment of the magnets MAG with the hall-effect sensors S. For instance, hall-effect sensors S may be connected to the power transmitter 74 while magnets MAG are connected to the power receiver 78. When all the magnets MAG are in desired alignment with their corresponding hall-effect sensor S (e.g, around a periphery of the power transmitter 74/power receiver 78), then corresponding alignment signals from all the hall-effect sensors S will be received by the power transfer controller 92 indicating that desired alignment has been achieved. Alternatively, the locators L may comprise optical sensors S and corresponding markers MAR wherein alignment is achieved once each of the optical sensors S is able to view a corresponding marker MAR. Other ways of verifying alignment and providing corresponding alignment feedback to the controllers 90, 92 to operate the actuators A1, A2 to achieve alignment have been contemplated. The controllers 90, 92 may be configured to operate one or more of the actuators A1, A2 in an automated manner to move at least one of the power receiver 78 and the power transmitter 74 to align with the other of the power receiver 78 and the power transmitter 74 based on signals from the locators L.

Referring back to the schematic diagram of FIG. 8, sensors S are configured to determine if power is being transferred from the power transmitter 74 to the power receiver 78. In some cases, only one sensor is used. The sensor S may be coupled to the apparatus controller 90 and the power receiver 78 to generate a signal that varies in response to the power receiver 78 being energized during power transfer. A separate sensor S may also be connected to the power transfer controller 92 and used to verify that the coils of the power transmitter 74 are active—to avoid a false signal from the sensor S associated with the power receiver 78. The sensors S may also be able to determine, through connection to the apparatus controller 90 and/or the power transfer controller 92, the efficiency of power transfer wherein higher efficiency means that more energy is being transferred per unit time. The controllers 90, 92 may be configured to control the alignment system 80 to automatically operate one or more of the actuators A1, A2 based on feedback from the sensors S to increase the efficiency of power transfer. In other words, alignment can be feedback-based to increase efficiency by better aligning the power receiver 78 with the magnetic field generated by the power transmitter 74. The sensors S may comprise one or more of the coils of the power receiver 78 and/or the coils of the power transmitter 74, separate coils connected to the apparatus controller 90 and/or power transfer controller 92, hall-effect sensors to sense changes in magnetic field, and the like.

One or more indicators I are coupled to the apparatus controller 90 and/or the power transfer controller 92. The indicators I are arranged to indicate that power is being transferred from the power transmitter 74 to the power receiver 78 based on the signals from the sensors S. The indicators I could be used in any of the embodiments described herein for this purpose. The indicators I comprise one or more of a visual indicator, an audible indicator, and a tactile indicator. The indicators I associated with the power transfer device 70 may be located on or adjacent to the power transmitter 74, on the floor surface F, on the wall surface W, on a user interface UI coupled to the power transfer controller 92, or any other suitable location. The indicators I associated with the patient support apparatus 30 may be located on or adjacent to the power receiver assembly 76, the base 34, the headboard 52 and/or footboard 54, the side rails 44, 46, 48, 50, or any other suitable locations. The indicators I may comprise LEDs, displays, speakers, eccentric motors to generate tactile feedback, piezoelectric devices, and the like.

A state detector SD is coupled to the apparatus controller 90 to determine a state of the energy storage device B. The state of the energy storage device B may comprise an energy level of the energy storage device B, a current capacity of the energy storage device B, whether the energy storage device B is being actively charged, when the energy storage device B will be depleted, a time remaining for operation of the patient support apparatus 30 based on the current state of the energy storage device B, and the like. The state detector SD may comprise any suitable electronic component or circuitry for measuring such states. For instance, the state detector SD may comprise one or more of a voltmeter, an amp-hour meter, and the like. Such states can also be indicated to the user via additional indicators I.

Figure 9A:
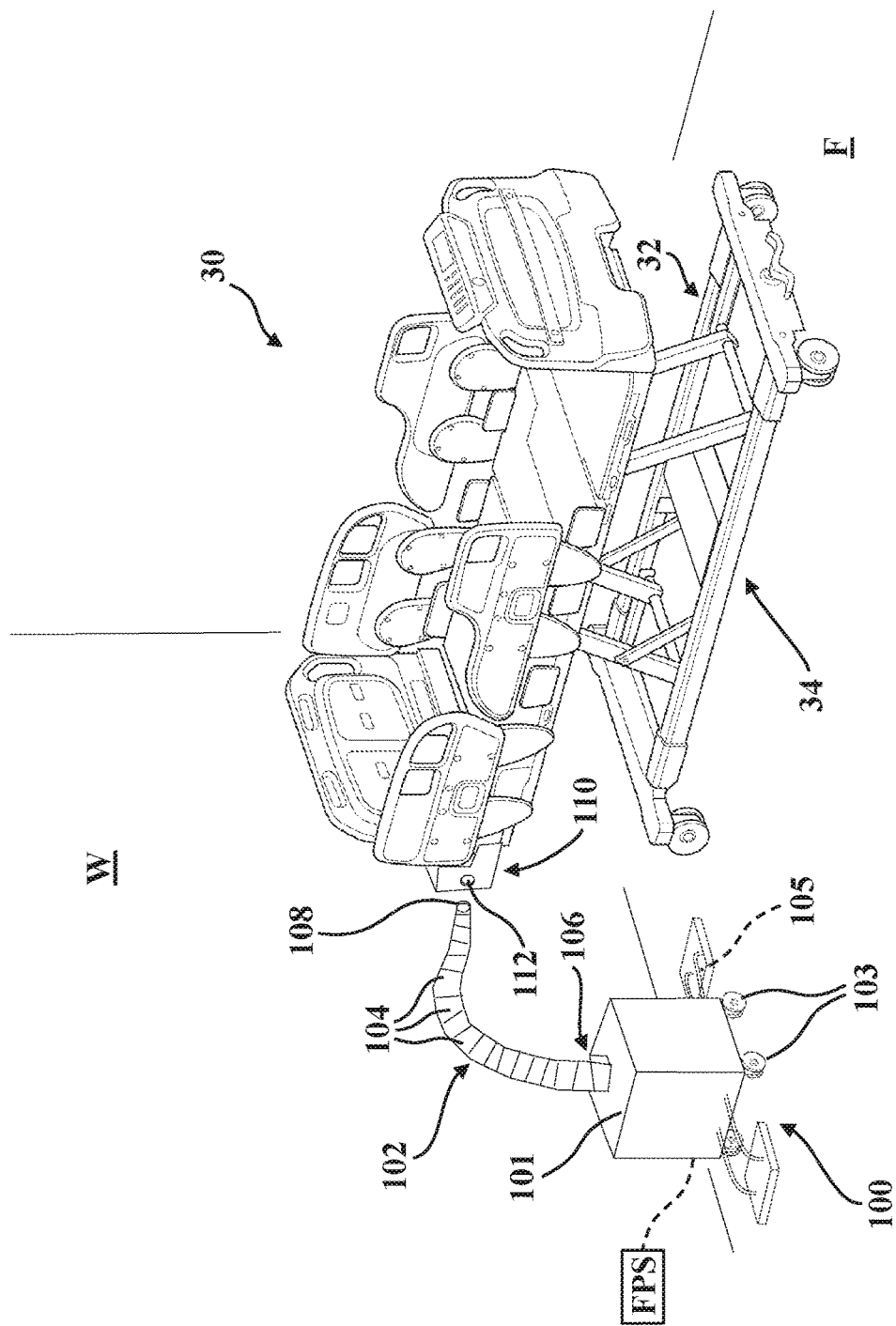
FIG. 9A is an illustration of an alternative power transfer device comprising an articulating robotic arm unconnected to the patient support apparatus.
Figure 9B:
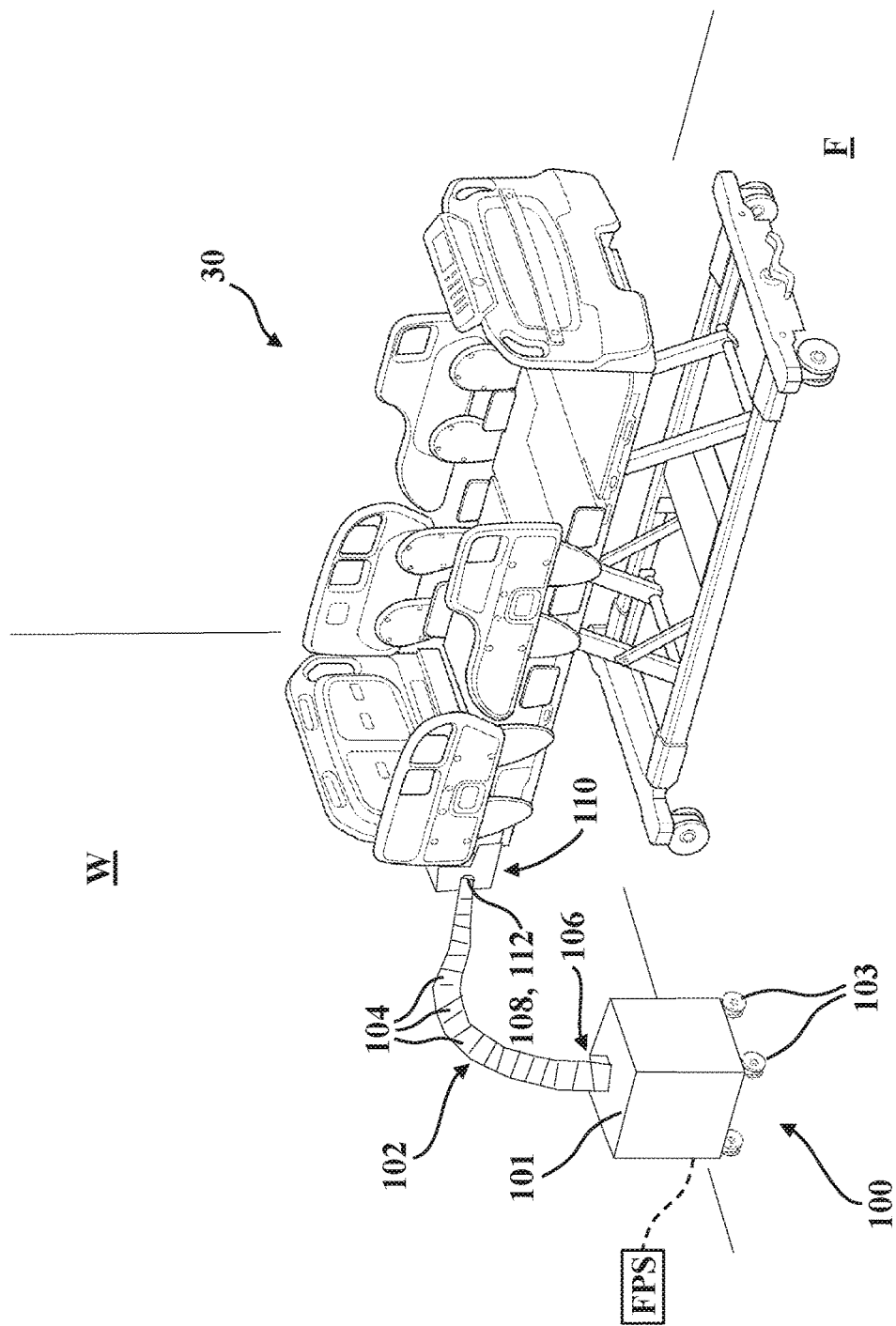
FIG. 9B is an illustration of the power transfer device of FIG. 9A illustrating the robotic arm connected to the patient support apparatus.
Figure 10:
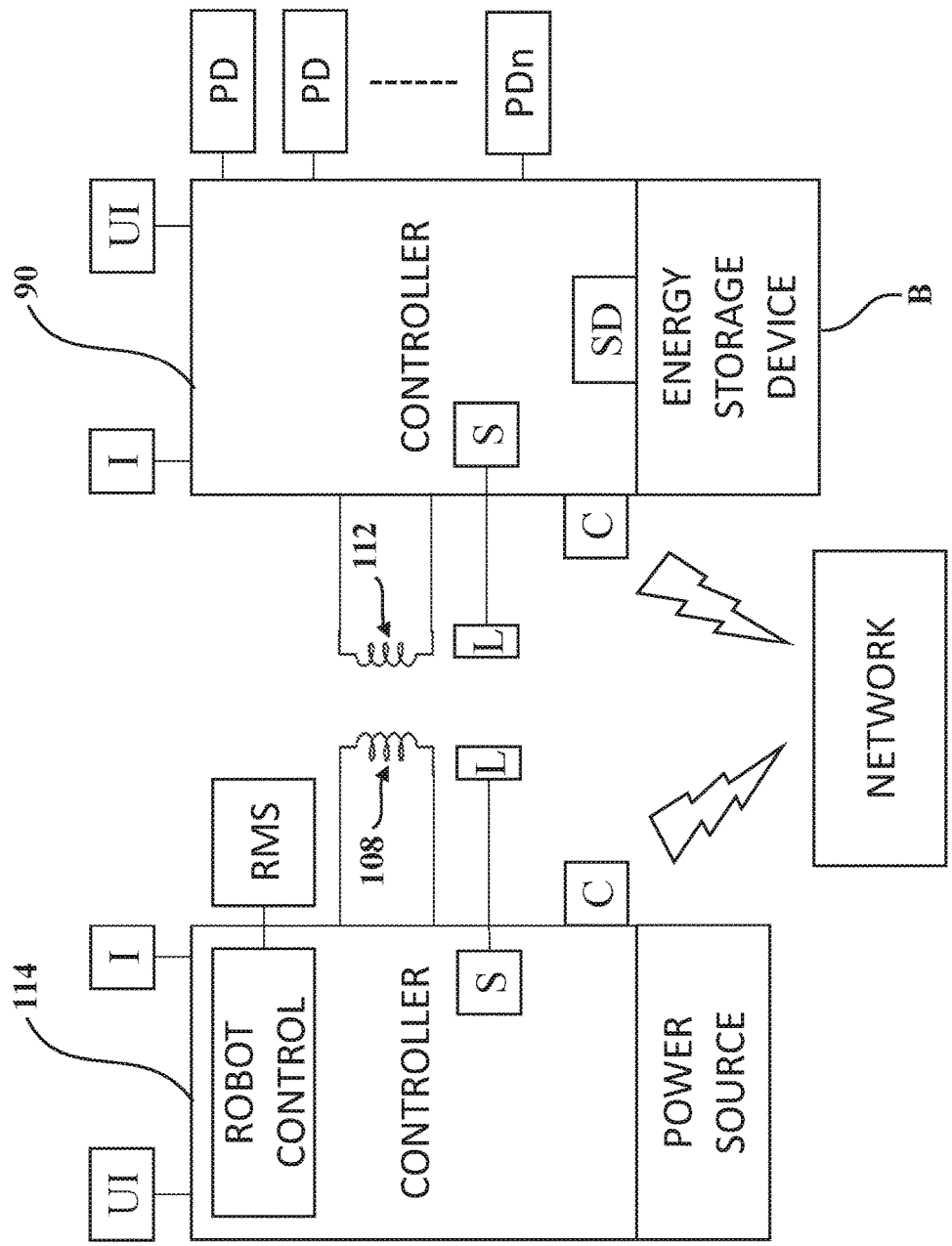
FIG. 10 is a schematic view of a control system for the alternative power transfer device of FIG. 9B.

Referring to FIGS. 9A, 9B, and 10, an alternative power transfer device 100 is shown. This power transfer device 100 comprises a robotic arm 102 having articulating segments 104 driven by one or more robot motors RMS (see FIG. 10). For instance, the articulating segments 104 may be moved directly by joint motors or may be steered by cables routed through the articulating segments 104 and connected to the robot motors RMS.

The power transfer device 100 also comprises a power transmitter assembly 106 having a power transmitter 108. Similar to the power transfer device 70 previously described, the power transfer device 100 is located, for instance, in the patient room and is connected to the fixed power source FPS. A power receiver assembly 110 having a power receiver 112 is provided on the patient support apparatus 30. The robotic arm 102 supports the power transmitter 108 at a distal end of the robotic arm 102. Thus, the robotic arm 102 acts as a carrier for the power transmitter 108. The robotic arm 102 is movable to align the power transmitter 108 with the power receiver 112 on the patient support apparatus 30 to transfer power from the fixed power source FPS to the patient support apparatus 30, such as by inductive coupling, as previously described. Alternatively, the power transmitter 108 and the power receiver 112 may be physically engaged in a wired power connection.

The power transfer device 100 may comprise a base 101 that is configured to rest stationary on the floor surface F or the wall surface W. Alternatively, the base 101 may be movable relative to the floor surface F and the wall surface W. For example, in one embodiment, the base 101 may be supported on wheels 103 (such as caster wheels) so that the base 101 is able to be manually moved for purposes of storage, connecting to other patient support apparatuses 30 and the like. The wheels 103 may be powered to assist with movement to be controlled by a user and/or could be part of an autonomous movement system of the power transfer device 100, similar to a mobile rover 200 described below.

In other embodiments, the base 101 could be movable along rails or tracks, such as the rails 105 shown in phantom in FIG. 9A. In this version, the rails 105 extend between blocks with the base 101 being slidably supported on the rails above the floor surface F for easy maneuvering from one patient transport apparatus 30 to another. The base 101 may comprise rollers (not shown) or other low friction devices to roll/ride along the rails 105. The rails or tracks may alternatively, or additionally, be placed along the wall surface W so that the base 101 slides along the wall surface W. Any of the adjustment mechanisms shown in FIG. 4 to move the power transmitter/receiver could likewise be used to move the base 101 in multiple degrees of freedom.

A controller 114 is shown in FIG. 10 to control movement of the robotic arm 102 to align the power transmitter 108 and the power receiver 112. In particular, the controller 114 employs a robot control module that provides commands to the robot motors RMS of the robotic arm 102 to move the robotic arm and the power transmitter 108 as desired. As shown in FIG. 9A, the power receiver 112 may be located in a port in the power receiver assembly 110 of the patient support apparatus 30 such that the robotic arm 102 provides a successful power transfer connection by inserting the power transmitter 108 into the port. The power transmitter 108 and the power receiver 112 may also comprise magnetically attractive couplers so that the power transmitter 108 is secured to the power receiver 112 during energy transfer. Similar to the embodiments described above, locators L may be used by the controller 114 as feedback to guide the robotic arm 102 and align the power transmitter 108 with the power receiver 112. Any suitable robotic mechanism may be used to move the power transmitter 108 relative to the power receiver 112, such as a serial robotic arm, a snake robot, and the like.

Figure 11:
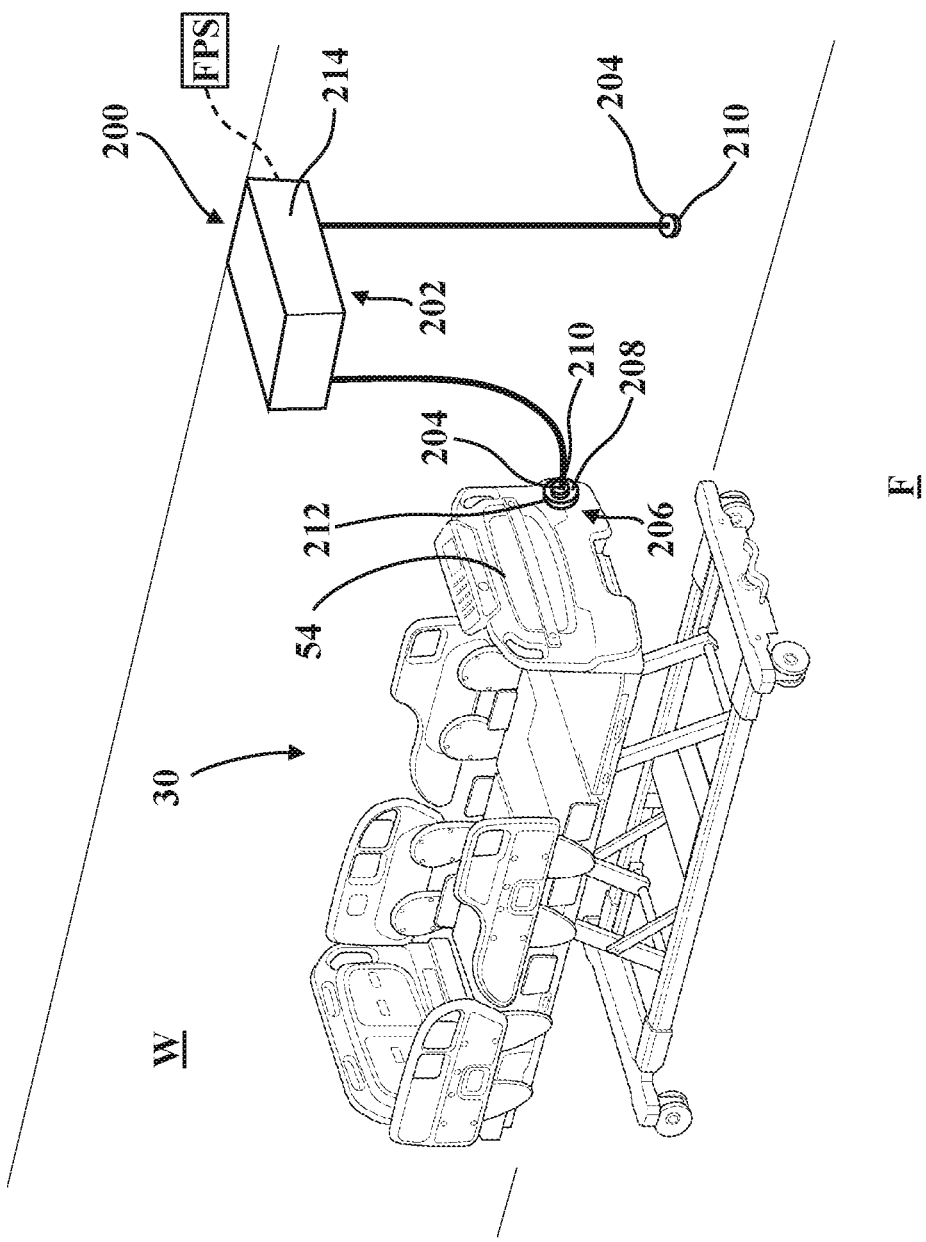
FIG. 11 is an illustration of an alternative power transfer device located in a hallway to transfer power to a patient support apparatus.

Referring to FIG. 11, another power transfer device 200 is shown. The power transfer device 200 comprises a power transmitter assembly 202 with a power transmitter 204. Similar to the previously described embodiments, the power transfer device 200 is coupled to the fixed power source FPS to transfer energy from the fixed power source FPS to the patient support apparatus 30, such as by inductive coupling. A power receiver assembly 206 is coupled to the patient support apparatus 30 and comprises a power receiver 208. The power transmitter 204 is configured to engage and physically contact the power receiver 208 in some embodiments. The power transmitter 204 comprises a first coupling 210 and the power receiver 208 comprises a second coupling 212 adapted to engage the first coupling 210 to transfer power. The couplings 210, 212 may be configured to magnetically engage one another by employing magnets, magnetically attractive materials, and/or the like. The first coupling 210 may be tethered to a housing 214 of the power transfer device 200 with an electrically conductive conduit, e.g., cord, etc. The second coupling 212 may be fixed to the footboard 54 of the patient support apparatus 30 or may be located at any other convenient location on the patient support apparatus 30. The couplings 210, 212 may additionally or alternatively comprise mating components such as a protruding post sized and shaped to engage a correspondingly sized and shaped pocket.

Multiple power transmitters 204 may be located throughout a facility to make connecting the patient support apparatus 30 to a power source more convenient for users. As shown in FIG. 11, the exemplary power transfer device 200 is shown mounted to a ceiling with two power transmitters 204 and associated first couplings 210 dangling from the ceiling and ready for connection to different patient support apparatuses 30. This power transfer device 200 may be located in a hallway, emergency room, patient room, or the like. The power transmitters 204 may be unpowered until a connection with a suitable power receiver 208 is detected, e.g., as detected by one or more sensors S such as hall-effect sensors. Power may be transferred through inductive coupling as previously described. Alternatively, the power transmitter 204 and the power receiver 208 may be physically engaged in a wired power connection.

Figure 12:
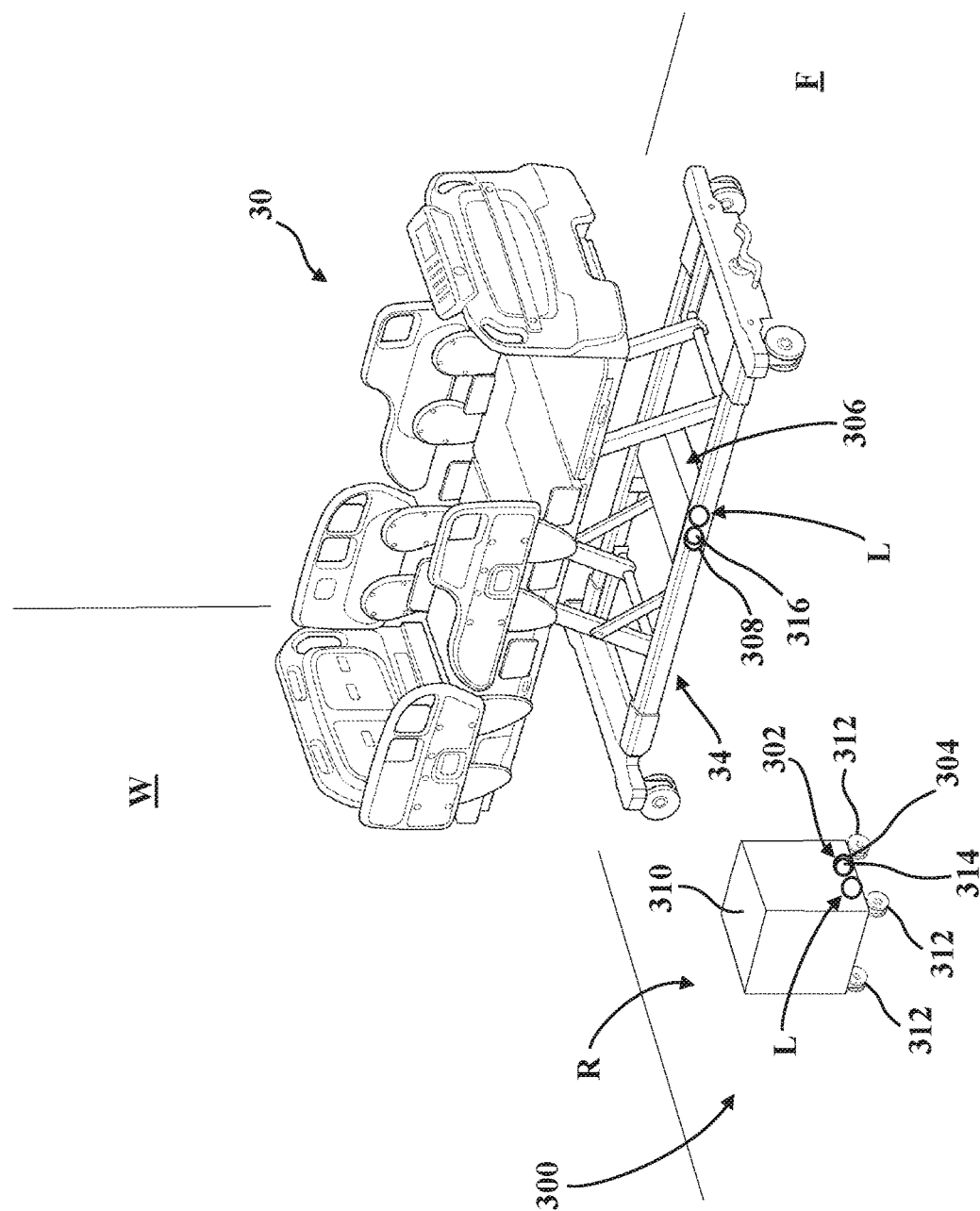
FIGS. 12 and 13 are illustrations of another power transfer device in the form of a mobile rover that docks with a patient support apparatus to transfer power to the patient support apparatus.
Figure 13:
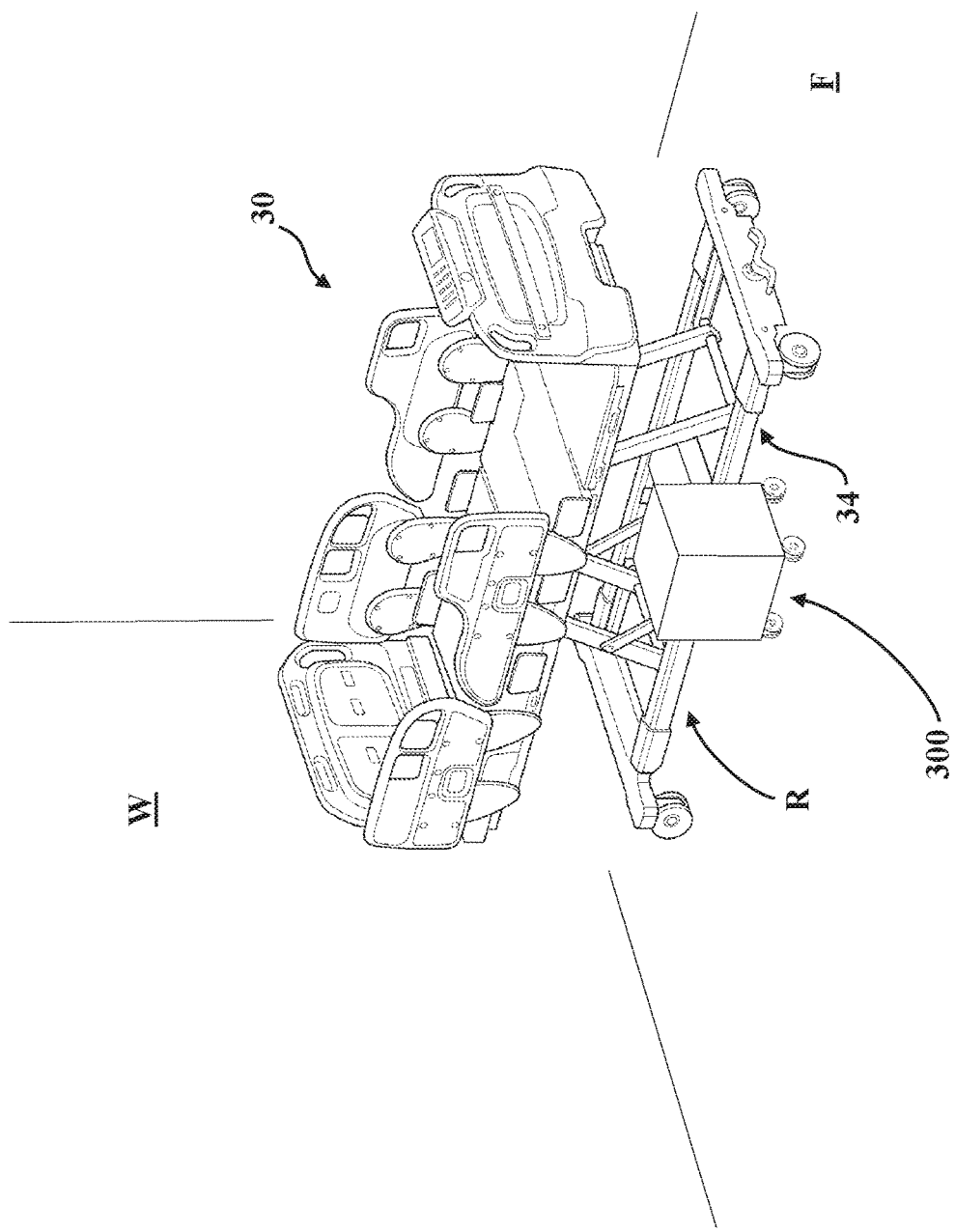

Referring to FIGS. 12 and 13, an alternative power transfer device 300 is shown comprising the mobile rover R employed to provide power to the patient support apparatus 30. The mobile rover R carries the power source in this embodiment to selectively provide power to various patient support apparatuses 30. The rover R is thus movable relative to the patient support apparatus 30 and controlled to move into position as shown in FIG. 13 to dock and connect to the patient support apparatus 30 to transfer energy to the patient support apparatus 30. The power transfer device 300 comprises a power transmitter assembly 302 having a power transmitter 304. The rover R acts as a carrier for the power transmitter 304. The power transfer device 300 may have an on-board power source, such as one or more batteries, or may route power from the fixed power source FPS to the patient support apparatus 30. The patient support apparatus 30 has a power receiving assembly 306 with a power receiver 308 configured to receive power from the power transmitter 304. The rover R comprises a casing 310 supported by wheels 312 to provide mobility to the rover R.

The power transmitter 304 is configured to engage and physically contact the power receiver 308 in some embodiments. The power transmitter 304 comprises a first coupling 314 and the power receiver 308 comprises a second coupling 316 adapted to engage the first coupling 314 to transfer power. The couplings 314, 316 may be configured to magnetically engage one another by employing magnets, magnetically attractive materials, and/or the like. The first coupling 314 may be connected to and fixed to the casing 310 of the rover R. The second coupling 316 may be connected to and fixed to the base 34 of the patient support apparatus 30 or may be located at any other convenient location on the patient support apparatus 30. The couplings 314, 316 may additionally or alternatively comprise mating components such as a protruding post sized and shaped to engage a correspondingly sized and shaped pocket.

The wheels 312 may comprise combinations of swiveling caster wheels, non-swiveling wheels, powered wheels, non-powered wheels, steerable wheels, non-steerable wheels, and the like. In the embodiment shown, four wheels are provided with two of the wheels 312 being powered, non-swiveling wheels and two of the wheels 312 being non-powered, steerable wheels. Driving devices, such as drive motors DM and steering motors SM (see FIG. 14) are coupled to the powered wheels and the steerable wheels. Accordingly, the rover R can be driven to selected patient support apparatuses or other equipment in the facility that may require power. The rover R may be driven via a user input device UI (see FIG. 14) on the rover R. The rover R could also be driven remotely by a remote input device, such as a portable electronic device. Such remote driving could be facilitated by one or more cameras (not shown) on the rover R that can be viewed by an operator on the portable electronic device while the operator drives and steers the rover R via commands using the portable electronic device. Such commands may comprise applying power to the powered wheels, discontinuing power to the powered wheels, varying the power applied to the powered wheels, steering the steering wheels, applying brakes, releasing brakes, and the like.

Alternatively, the rover R can be autonomously controlled by a rover controller 320, which can autonomously control operation of the drive motors DM and the steering motors SM to move between locations in response to a charge request signal. The rover R is operable to autonomously drive into proximity of the patient support apparatus 30, a charging station 322, a maintenance station (not shown), or any other location as needed. One example of an autonomous driving system that could be utilized is shown in U.S. Patent Application Publication No. 2016/0367415, entitled "Patient Support Apparatuses With Navigation And Guidance Systems," filed on Jun. 17, 2016, hereby incorporated by reference.

Figure 14:
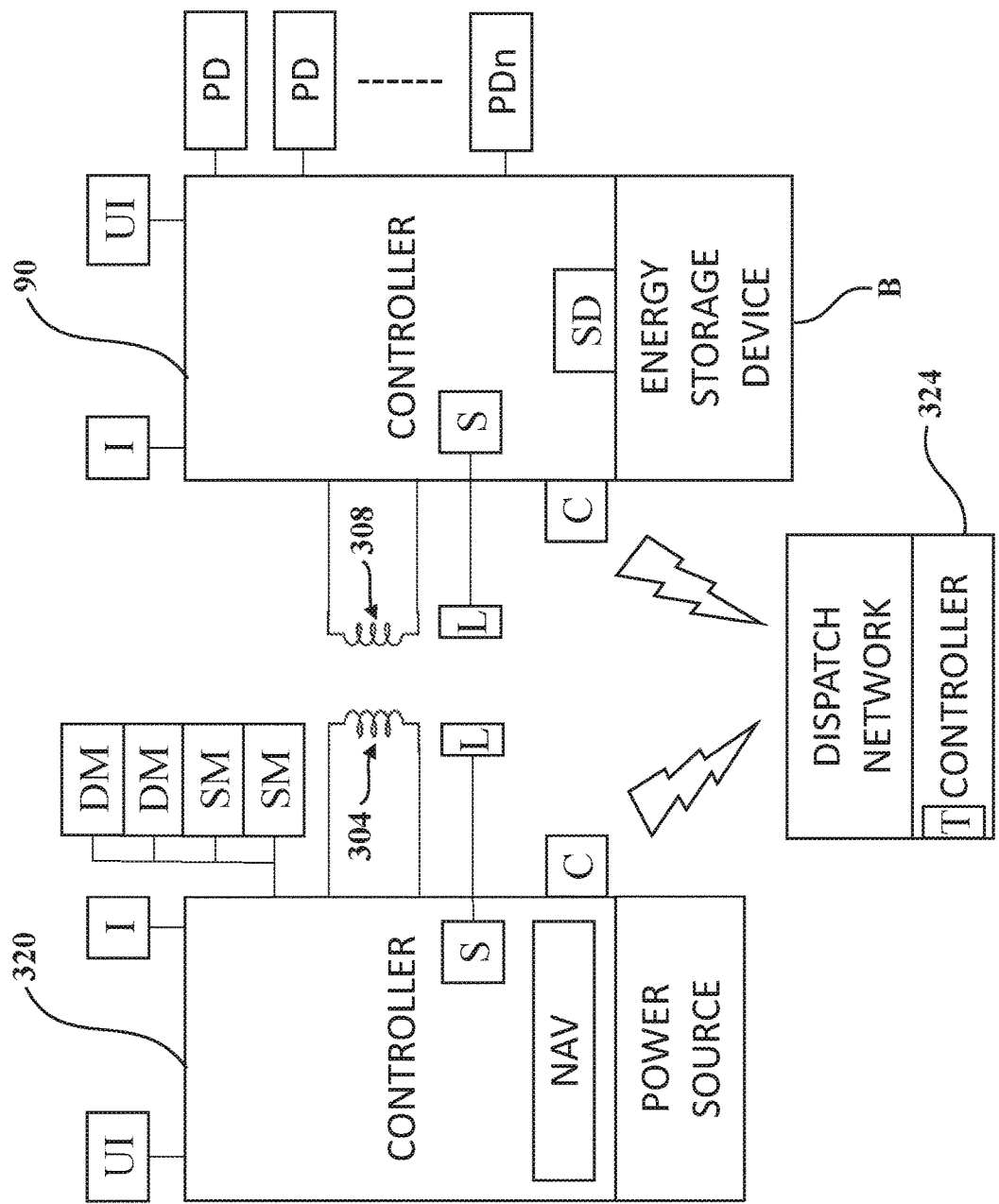
FIG. 14 is a schematic view of a control system for the rover of FIGS. 12 and 13 illustrating connection to the patient support apparatus.

Referring to FIG. 14, a dispatch network is shown to control movement of the rovers R throughout a facility. A tracker module T may be coupled to a central controller 324 connected to the dispatch network. The tracker module T may be wireles sly connected to navigation guidance NAV provided on each of the rovers R to track a location of each of the rovers R. The navigation guidance NAV may be provided by global positioning systems (GPS) or other asset tracking systems available to locate and track movement of the rovers R throughout the facility. Information related to such locations can be routed to the dispatch network via the communication devices C, such as via wireless communication between the central controller 324 and the rover controller 320. The central controller 324 is configured to instruct the rover controller 320 to transport the rover R to a desired location based on signals/data sent to the navigation guidance NAV from the tracker module T. The navigation guidance NAV and associated tracker module T may be used to move the rover R autonomously. The central controller 324 may also be in wireless communication with the apparatus controllers 90 so that the central controller 324 is provided with information derived from the state detectors SD regarding a current state of the energy storage device B on the patient support apparatus 30, e.g., to determine if the energy storage device B requires charging. Based on this information, the central controller 324 may dispatch the nearest rover R to provide power and/or charge the energy storage device B on the patient support apparatus 30.

The central controller 324 can analyze information received from the patient support apparatuses 30 and the rovers R so that the central controller 324 knows the location, availability, and status of all of the patient support apparatuses 30, and whether they require power or when they may soon require power.

The central controller 324 may also be able to provide inventory management services by estimating the availability of the rovers R, such as by monitoring the current status of the rovers R and accounting for time needed to carry out current tasks, and the like. For instance, even though a rover R may currently be charging a patient support apparatus 30, the central controller 324 is able to determine the length of time until charging is complete and when the rover R will be ready for charging the next patient support apparatus 30, or when the rover R itself requires charging such as at a nearby charging station 322. The central controller 324 can store such times and display such times at a central station, on displays connected to the central controller 324 via another network (e.g., local area network, wide area network), on displays connected to the patient support apparatuses 30 and/or the rovers R, on portable electronic devices, and the like.

The central controller 324 can also estimate a time when the patient support apparatus 30 will be ready for use and can provide messages to users associated with such information. Additionally, the central controller 324 is configured to generate an alert in response to the energy storage device B on a patient support apparatus 30 falling below a threshold level and can automatically dispatch an available, and nearest rover R in response to such alerts and/or notify a caregiver associated with the particular patient support apparatus 30. The central controller 324, by knowing the location of all the rovers R being used, and their current capacity for transferring power, can command the closest rover R to the patient support apparatus 30. All of the information described herein can also be transferred among any of the rovers R and patient support apparatuses 30 to be displayed thereon.

The central controller 324 may comprise one or more microprocessors for processing instructions or for processing algorithms stored in memory to transmit, receive, and/or analyze information to/from the rovers R, the patient support apparatuses 30, and/or the charging stations 322. In particular, the central controller 324 is in communication with the apparatus controllers 90, rover controllers 320, and charge station controllers 326 described below to carry out these functions. The control system may be configured so that any of the rovers R can be controlled or interrogated from any location. For instance, charge request signals can be made from any location through the control system to one of the rovers R.

Locators L, like those previously described, may be used by the rover controller 320 to drive the drive motors DM and the steering motors SM as needed to dock the rover R to the patient support apparatus 30, i.e., to mate the couplings 314, 316. For instance, the navigation guidance NAV may provide gross locating of the rover R in the patient room, while the locators L enable docking of the rover R to the patient support apparatus 30. Similar docking may occur between the rover R and the charging station 322 described further below. In some cases, the rovers R may be manually moved by users and manually docked to the patient support apparatus 30 and/or the charging stations 322. In other cases, the rover R and/patient support apparatus 30 may be equipped with the actuators A1 and/or A2 as described above to assist in aligning the power transmitter 304 and the power receiver 308.

Figure 15:
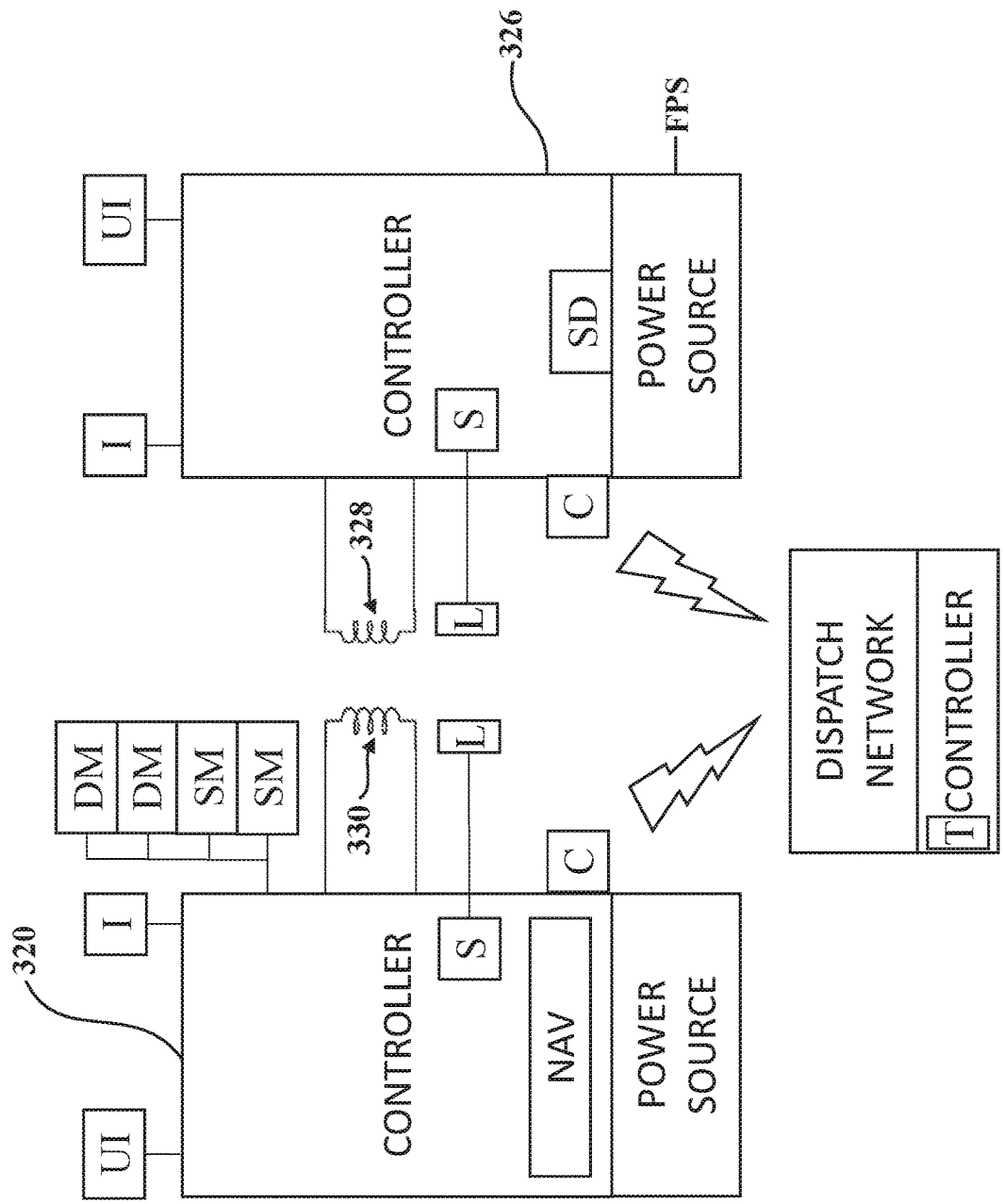
FIG. 15 is a schematic view of the control system for the rover of FIGS. 12 and 13 illustrating connection to a charging station.

Referring to FIG. 15, the charging station 322 for the rovers R is schematically shown. The dispatch network is configured to determine a state of the power source on the rover R as previously described and determine if the rover R has adequate power to perform all of the following tasks: (1) move to a desired location in response to a charge request signal; (2) transfer power to the power receiver 308 on the patient support apparatus 30 at the desired location; and (3) still return to the charging station 322 before the power source on the rover R is depleted. If not all of these tasks can be performed, another rover R is considered and/or the rover R is first charged before dispatch to the patient support apparatus 30. Multiple charging stations 322 may be located throughout the facility for charging the rovers R. The charging stations 322 route power from the fixed power source FPS to the rovers R to ready the rovers R for dispatch to the next patient support apparatus 30 that requires charging. The charging station 322 comprises its own power transmitter 328 for routing power from the fixed power source FPS to a power receiver 330 on the rover R (which could be the same as the power transmitter 304 or different).

Figure 16:
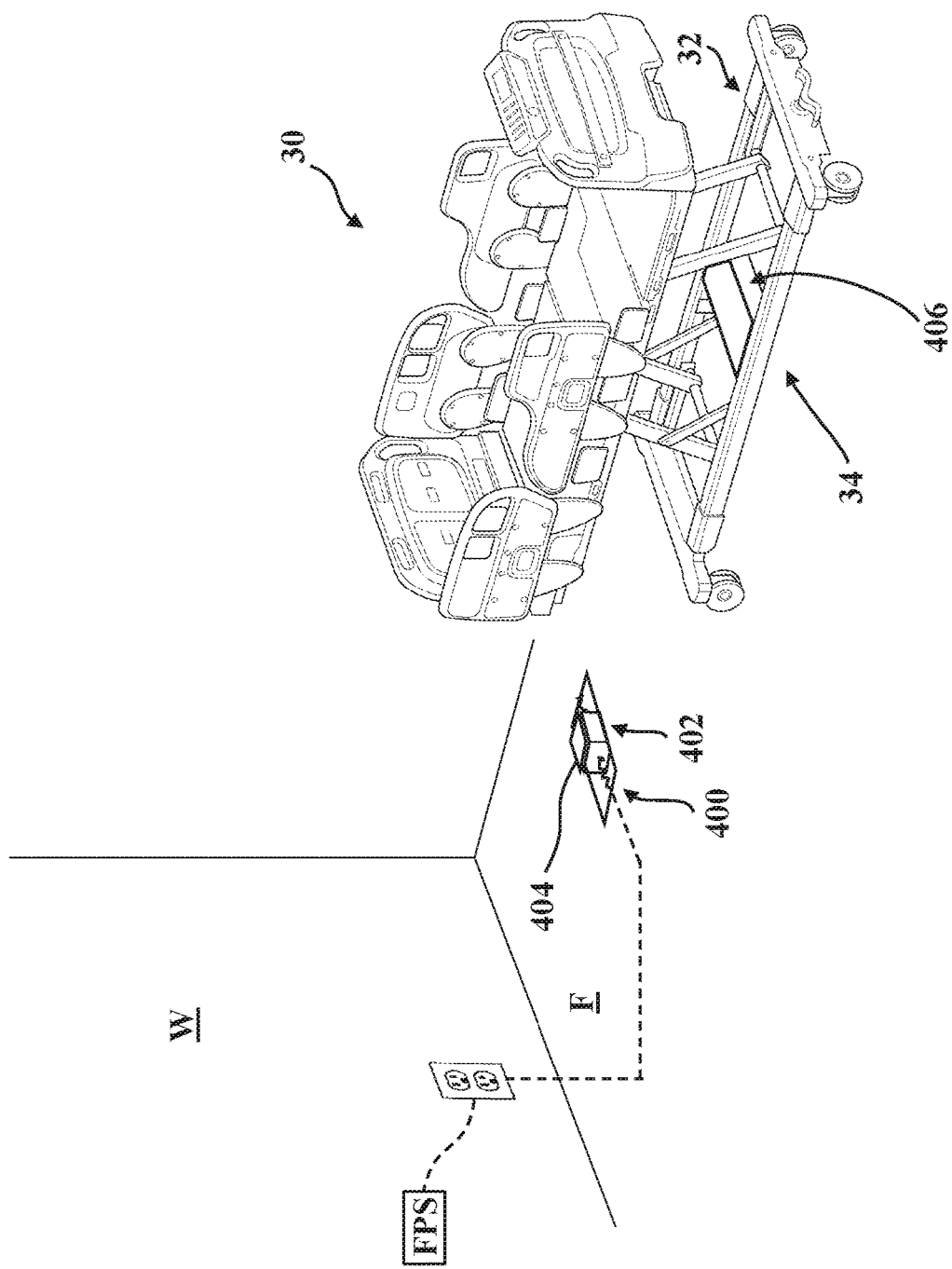
FIG. 16 is an illustration of another patient support apparatus with a manual alignment system in relation to a power transfer device located in the floor.
Figure 17:
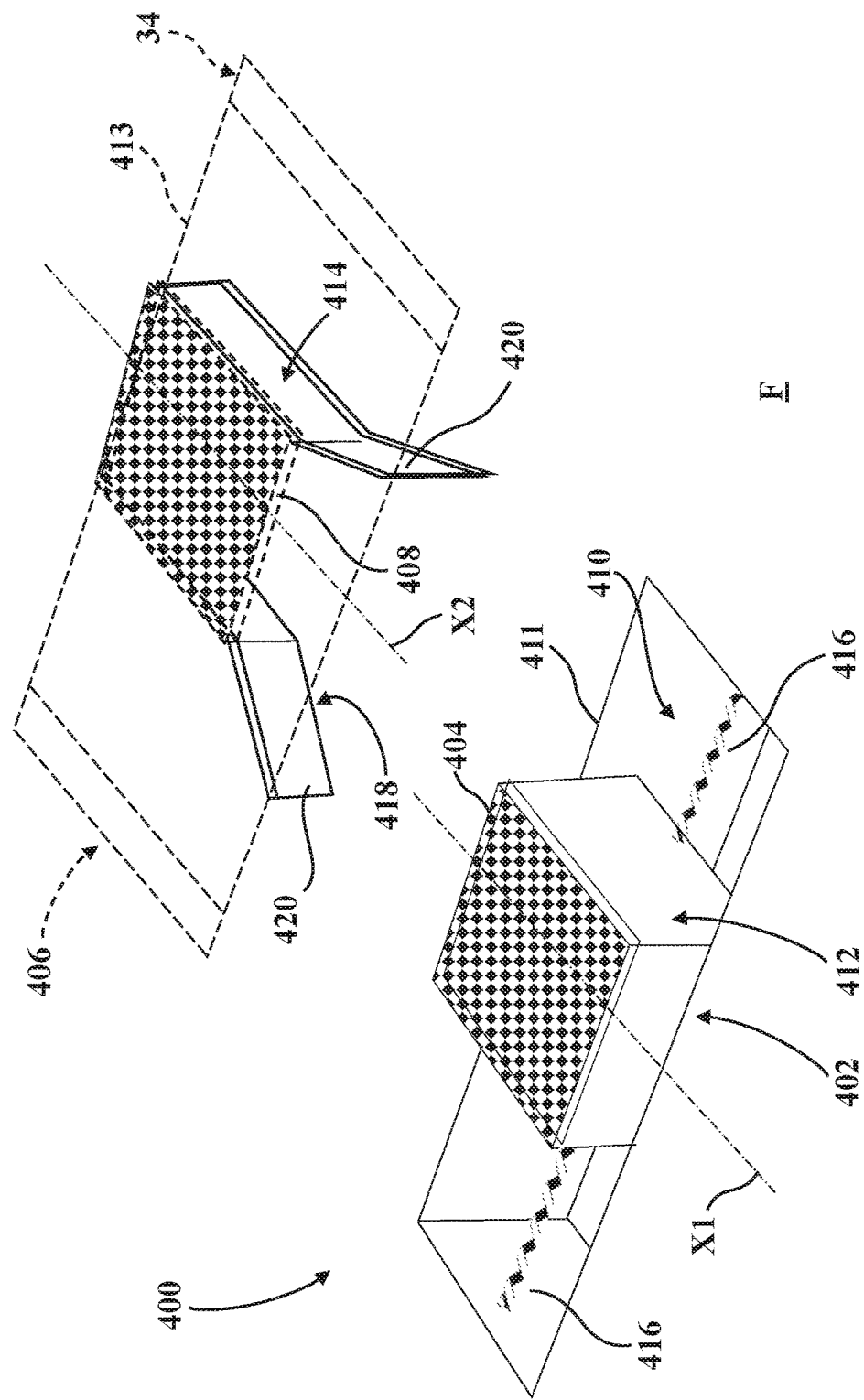
FIG. 17 is a perspective view of an alignment guide of a power receiver assembly of the patient support apparatus of FIG. 16 prior to engagement with a power transmitter assembly of the power transfer device of FIG. 16.

Referring to FIGS. 16 and 17, another power transfer system is shown that is similar to that shown in FIGS. 2-4. Referring to FIG. 16, an alternative power transfer device 400 comprises a power transmitter assembly 402 with a power transmitter 404 that is movable relative to the floor surface F. A power receiver assembly 406 having a power receiver 408 (see FIG. 17) is located on the patient support apparatus 30. The power transmitter 404 and/or the power receiver 408 are configured to move relative to one another to align the power transmitter 404 and the power receiver 408.

In the embodiment shown, the power receiver 408 is coupled to the base 34 of the support structure 32. However, the power receiver 408 may be located at any suitable location on the patient support apparatus 30. The power transfer device 400 is located in the floor adjacent to the floor surface F so that the power transmitter 404 is able to move with respect to the floor surface F. However, the power transfer device 400 may be located at any suitable location to transfer power to the power receiver 408. For example, the power transfer device 400 may be located in the wall adjacent to the wall surface W.

Referring to FIG. 17, an alignment system 410 is provided to align the power transmitter 404 with the power receiver 408 so that efficient energy transfer occurs from the power transmitter 404 to the power receiver 408. Alignment may comprise any alignment between the power transmitter 404 and the power receiver 408, such as vertical alignment, longitudinal alignment, and/or lateral alignment. Alignment may also comprise distance alignment, e.g., placing the power transmitter 404 within a desired distance of the power receiver 408 and/or may comprise orientation alignment so that the coils of the power receiver 408 are in a desired relationship to the coils of the power transmitter 404. Other forms of alignment are also contemplated.

The alignment system 410 comprises a first carrier 412 coupled to the power transmitter 404 and a second carrier 414 coupled to the power receiver 408. The alignment system 410 further comprises one or more biasing devices 416, such as springs, arranged to enable one or both of the carriers 412, 414 to move relative to their respective housings 411, 413 to align the power transmitter 404 and the power receiver 408 in any manner previously described. In the embodiment of FIG. 17, the first carrier 412 is movable relative to the base 34 of the support structure 32, the floor surface F, and/or the wall surface W to align the power transmitter 404 and the power receiver 408.

The first carrier 412 comprises a body suspended in the housing 411 by the biasing devices 416 so that the first carrier 412 is able to be manipulated in multiple degrees of freedom relative to the housing 411, such as in six degrees of freedom. The second carrier 414 comprises a guide 418 coupled to the power receiver 408. The guide 418 comprises one or more geometric features shaped to engage and guide the first carrier 412 such that the power transmitter 404 aligns with the power receiver 408 once the patient support apparatus 30 is wheeled into position over the power transfer device 400. More specifically, in the embodiment shown, the guide 418 comprises a pair of guide walls 420 defining a width that narrows toward the power receiver 408 so that the power transmitter 404 is guided toward the power receiver 408 and the patient support apparatus 30 is wheeled into its final position over the power transfer device 400. FIG. 17 illustrates the guide 418 prior to engaging the first carrier 412.

In operation, as the patient support apparatus 30 is wheeled into position over the power transfer device 400, if the power transmitter 404 is not in alignment with the power receiver 408, the first carrier 412 is engaged by the guide walls 420. FIG. 17 shows two misaligned longitudinal axes X1, X2 that are to be aligned by virtue of the guide 418. Owing to the weight of the patient support apparatus 30, and the relatively low force of the springs suspending the first carrier 412, the first carrier 412 is passively movable to adjust in position to slide along the guide 418 until the power transmitter 404 is fully received in the guide 418 and in alignment with the power receiver 408. Such alignment can be indicated by any of the indicators I previously described. Other guides are contemplated as well. Furthermore, physical coupling between the power transmitter 404 and the power receiver 408, such as through magnetically attractive components, may be employed to further ensure alignment. In this embodiment, the alignment system 410 operates manually to align the power transmitter 404 with the power receiver 408.

Figure 18:
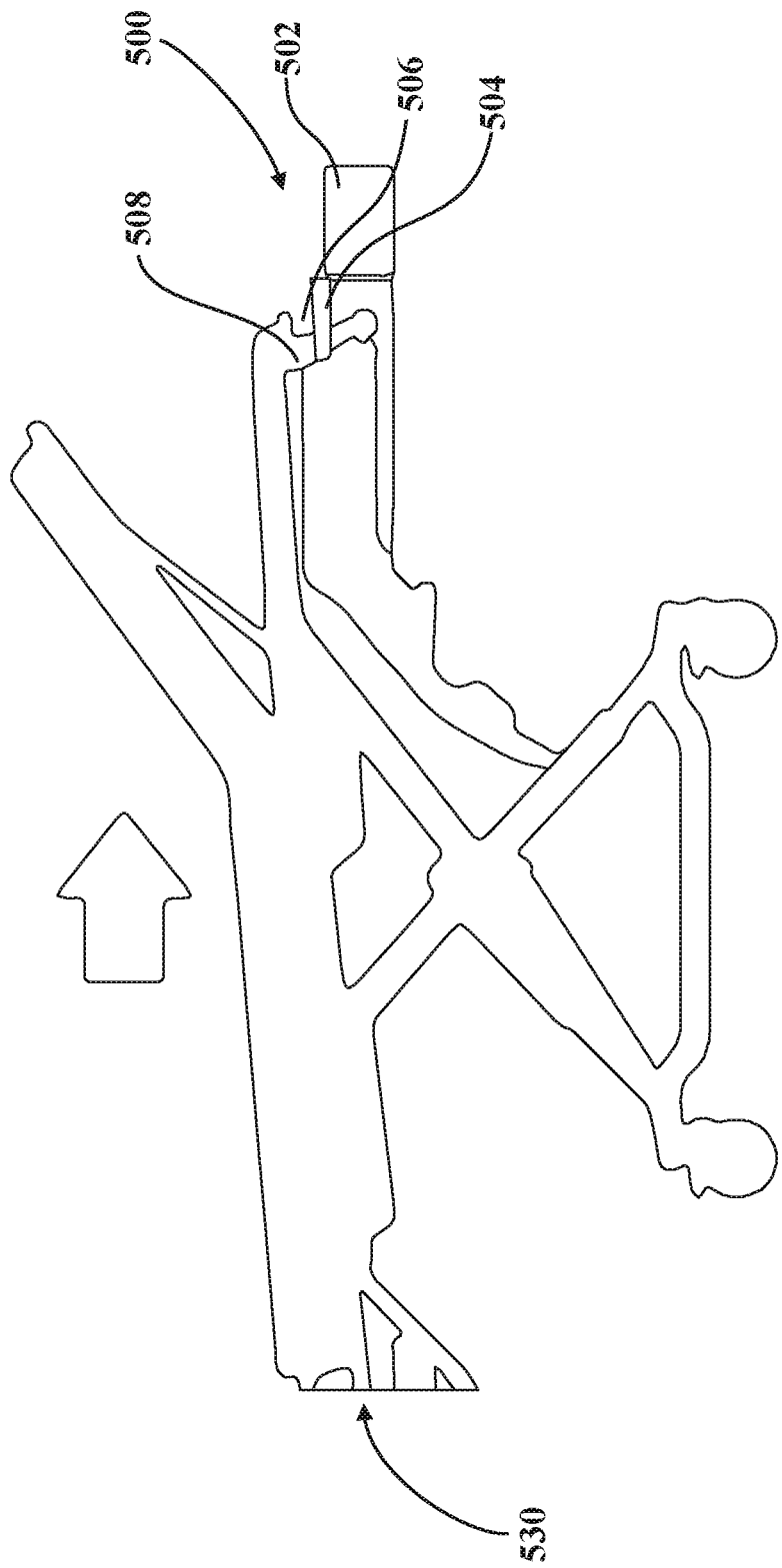
FIG. 18 is an illustration of a cot having a power receiver and a loading system having a latch assembly with a power transmitter.

Referring to FIG. 18, an alternative patient support apparatus 530 comprises a cot and an alternative power transfer device 500 comprises a loading system 502 configured to load the cot into a vehicle, such as an ambulance, helicopter, and the like. The loading system 502 comprises a latch assembly 504. In this embodiment, a power transmitter 506 is coupled to the latch assembly 504 to transfer power to a power receiver 508 on the cot. The power receiver 508 may be located on the cot in a position such that, when latched to the loading system 502, the power receiver 508 is aligned with the power transmitter 506. The latch assembly 504 thus acts as a carrier in this embodiment to carry and move the power transmitter 506 and align it with the power receiver 508 when the cot is latched to the loading system 502.

It will be further appreciated that the terms "include," "includes," and "including" have the same meaning as the terms "comprise," "comprises," and "comprising."

Several embodiments have been discussed in the foregoing description. However, the embodiments discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A method of transferring power to a power receiver coupled to an energy storage device of a patient support apparatus, the method comprising:

moving the patient support apparatus towards a power transfer device having a controller and a power transmitter coupled to a power source;

operating the controller of the power transfer device to generate a magnetic field with the power transmitter;

sensing, with a sensor disposed in communication with the controller, the magnetic field generated by the power transmitter;

moving a carrier of an alignment system with an actuator to align the power transmitter of the power transfer device with the power receiver of the patient support apparatus based on the magnetic field generated by the power transmitter and sensed by the sensor based on the relative alignment of the power transmitter and the power receiver; and delivering power from the power source to the energy storage device of the patient support apparatus with the power transmitter aligned with the power receiver.

2. The method of claim 1, wherein moving the carrier of the alignment system is further defined as moving the power receiver coupled to the actuator to align the power transmitter of the power transfer device with the power receiver of the patient support apparatus based on the magnetic field generated by the power transmitter.

3. The method of claim 2, further comprising moving a second carrier of the alignment system with a second actuator coupled to the power transmitter to align the power transmitter of the power transfer device with the power receiver of the patient support apparatus based on the magnetic field generated by the power transmitter.

4. The method of claim 3, wherein the power transfer device is disposed on a floor surface and the second actuator is configured to move the power transmitter relative to the floor surface.

5. The method of claim 3, wherein the power transfer device is disposed on a wall surface and the second actuator is configured to move the power transmitter relative to the wall surface.

6. The method of claim 1, further comprising:

determining, with the controller, if power is being transferred from the power transmitter to the power receiver; and indicating, via an indicator coupled to the controller, that power is being transferred from the power transmitter to the power receiver, wherein the indicator comprises one or more of a visual indicator, an audible indicator, and a tactile indicator.

7. The method of claim 1, further comprising engaging a first coupling of the power transmitter in physical contact with a second coupling of the power receiver.

8. The method of claim 7, wherein the first and second couplings are configured to magnetically engage.

9. The method of claim 1, further comprising wirelessly transferring power from an inductive power transmitter of the power transmitter to an inductive power receiver of the power receiver.

10. The method of claim 1, wherein the power receiver is located on a support structure of the patient support apparatus.

11. The method of claim 1, wherein the carrier comprises a post and the actuator of the alignment system is configured to extend and retract the post relative to the power receiver to transfer power.

12. The method of claim 1, wherein the power transfer device comprises a robotic arm of articulating segments supporting the power transmitter to align the power transmitter with the power receiver.

13. The method of claim 1, wherein the patient support apparatus comprises a cot; and
the power transfer device comprises a loading system configured to load the cot into a vehicle, the loading system including a latch assembly with the power transmitter being coupled to the latch assembly.

14. The method of claim 1, wherein the patient support apparatus comprises a second controller coupled to the power receiver and to the actuator.

15. The method of claim 1, wherein the alignment system is configured to be manually operated.

16. The method of claim 1, further comprising engaging the patient support apparatus to passively move the carrier.

17. The method of claim 1, wherein the sensor comprises a hall-effect sensor coupled to the power receiver and configured to generate variable signals based on the relative alignment of the power transmitter and the power receiver.

18. The method of claim 1, further comprising inducing, with one or more coils of the power transmitter, electrical current within one or more coils of the power receiver.

19. The method of claim 18, wherein the sensor comprises one or more coils of the power receiver.

20. The method of claim 18, wherein the sensor comprises one or more additional coils coupled to the controller and separate from the one or more coils of the power receiver.

21. A method of transferring power to a power receiver coupled to an energy storage device of a patient support apparatus, the method comprising:

moving the patient support apparatus towards a power transfer device having a controller and a power transmitter coupled to a power source, wherein the power transfer device comprises a rover movable relative to the patient support apparatus;

operating the controller of the power transfer device to generate a magnetic field with the power transmitter;

moving a carrier of an alignment system with an actuator to align the power transmitter of the power transfer device with the power receiver of the patient support apparatus based on the magnetic field generated by the power transmitter;

delivering power from the power source to the energy storage device of the patient support apparatus with the power transmitter aligned with the power receiver;

determining a location of the rover with a tracker module coupled to a dispatch network;

communicating a state the energy storage device to the dispatch network;

communicating a state of the power source to the dispatch network;

carrying the power source with the rover; and instructing the rover to move to a desired location based on data from the tracker module.

* * * * *